(12) United States Patent
Inaba

(10) Patent No.: US 6,301,446 B1
(45) Date of Patent: Oct. 9, 2001

(54) STEREO CAMERA

(76) Inventor: Minoru Inaba, No. 1115, Oaza Samukawa, Oyami (JP)

( * ) Notice: Subject to any disclaimer, the term of this patent is extended or adjusted under 35 U.S.C. 154(b) by 0 days.

(21) Appl. No.: 09/332,918

(22) Filed: Jun. 14, 1999

(51) Int. Cl.$^7$ ................................................. G03B 35/00
(52) U.S. Cl. ........................................................ 396/324
(58) Field of Search ................................. 396/322, 324, 396/326, 327, 333, 334

(56) References Cited

U.S. PATENT DOCUMENTS

| | | | |
|---|---|---|---|
| 1,596,835 | 8/1926 | Hewson | 396/326 |
| 1,871,281 | 8/1932 | Savage | 396/326 |
| 2,458,466 | 1/1949 | Campbell | 396/325 |
| 2,803,179 | 8/1957 | Donaldson | 396/326 |
| 2,834,270 | 5/1958 | Williams | 396/327 |
| 2,851,937 | 9/1958 | Ziegler et al. | 396/326 |
| 3,068,772 | 12/1962 | MacNeille | 396/141 |
| 3,115,816 | 12/1963 | Muller | 396/327 |
| 3,608,458 | 9/1971 | Ratliff, Jr. | 95/18 |
| 3,687,031 | 8/1972 | Jahnsman | 95/11 |
| 3,953,869 | 4/1976 | Lo et al. | 396/327 |
| 3,967,300 | 6/1976 | Oshima | 354/288 |
| 4,040,071 | 8/1977 | Shane | 396/325 |
| 4,249,798 | 2/1981 | Moskovich | 350/423 |
| 4,418,993 | 12/1983 | Lipton | 352/57 |
| 4,462,025 | 7/1984 | Murakami et al. | 340/743 |
| 4,597,659 | 7/1986 | Suda et al. | 354/409 |
| 4,712,900 | 12/1987 | Hamano et al. | 396/133 |
| 4,879,596 | 11/1989 | Miura et al. | 358/88 |
| 5,355,253 | 10/1994 | Nanjo et al. | 359/473 |
| 5,504,547 | 4/1996 | Mizukawa | 354/114 |
| 5,548,362 | 8/1996 | Lo et al. | 396/326 |
| 5,685,626 | 11/1997 | Inaba | 353/120 |
| 5,701,532 | 12/1997 | Inaba | 396/326 |
| 5,715,489 | 2/1998 | Inaba | 396/327 |
| 5,720,538 | 2/1998 | Inaba | 353/9 |
| 5,722,751 | 3/1998 | Inaba | 353/7 |
| 5,737,655 | 4/1998 | Inaba | 396/324 |
| 5,752,111 | * 5/1998 | Morton | 396/324 |
| 5,778,268 | 7/1998 | Inaba | 356/326 |
| 5,879,064 | 3/1999 | Inaba | 353/7 |
| 5,892,994 | 4/1999 | Inaba | 396/326 |

* cited by examiner

*Primary Examiner*—David M. Gray
(74) *Attorney, Agent, or Firm*—Fattibene & Fattibene; Paul A. Fattibene; Arthur T. Fattibene

(57) ABSTRACT

A stereo camera which decreases loss of picture caused by the disagreement of photographing ranges between the right and left lenses. The distance Pl between the optical axes of the right and left photographing lenses 10R, 10L is set to be nearly midway between a distance $Pl_{max}$ between the optical axes at which the photographing ranges of the right and left photographing lenses come into agreement with each other at an infinite point and a distance $Pl_{min}$ between the optical axes at which the photographing ranges of the right and left photographing lenses come into agreement with each other at the shortest photographing distance. When taking a picture at a close range, the disagreeing portions of the right and left pictures are nearly halved compared with the conventional stereo cameras in which the distances between the optical axes is set to be nearly equal to the distance between the centers of the right and left pictures, enabling the films to be mounted on a stereo slide mount having windows of an increased width.

21 Claims, 24 Drawing Sheets

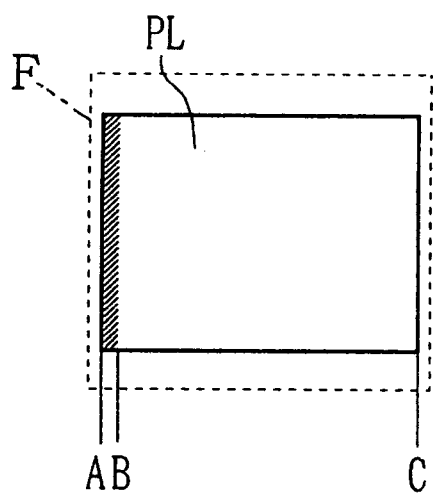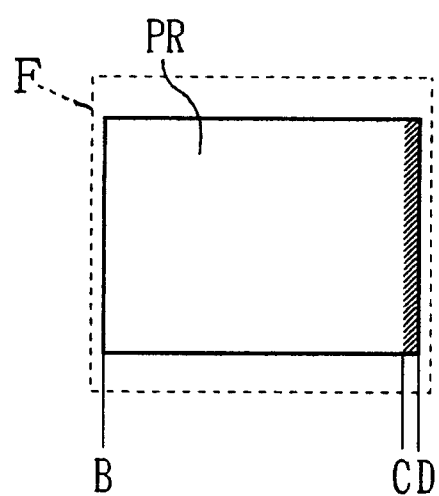

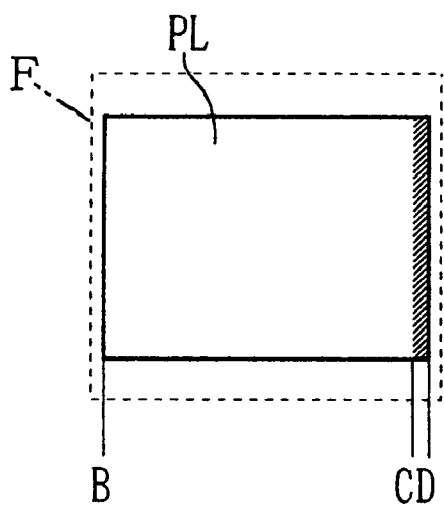
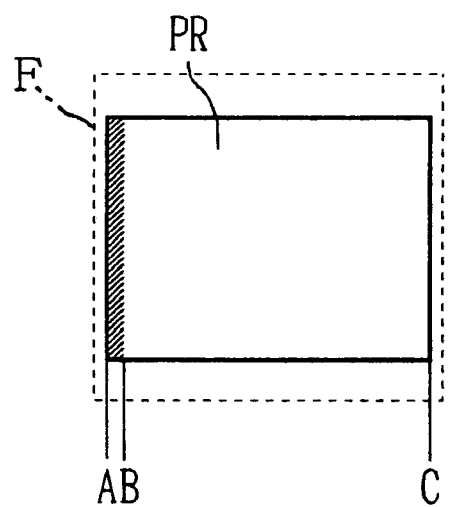

Fig. 7

Chart 1

| GUIDE # | Window Width of Mount | Photographing Distance L |
|---|---|---|
| 0 | 32.00 | ∞ — 2500 |
| 1 | 31.50 | 2499 — 1669 |
| 2 | 31.00 | 1668 — 1248 |
| 3 | 30.50 | 1247 — 1000 |
| 4 | 30.00 | 999 — 836 |
| 5 | 29.50 | 835 — 720 |
| 6 | 29.00 | 719 — 633 |

(mm)

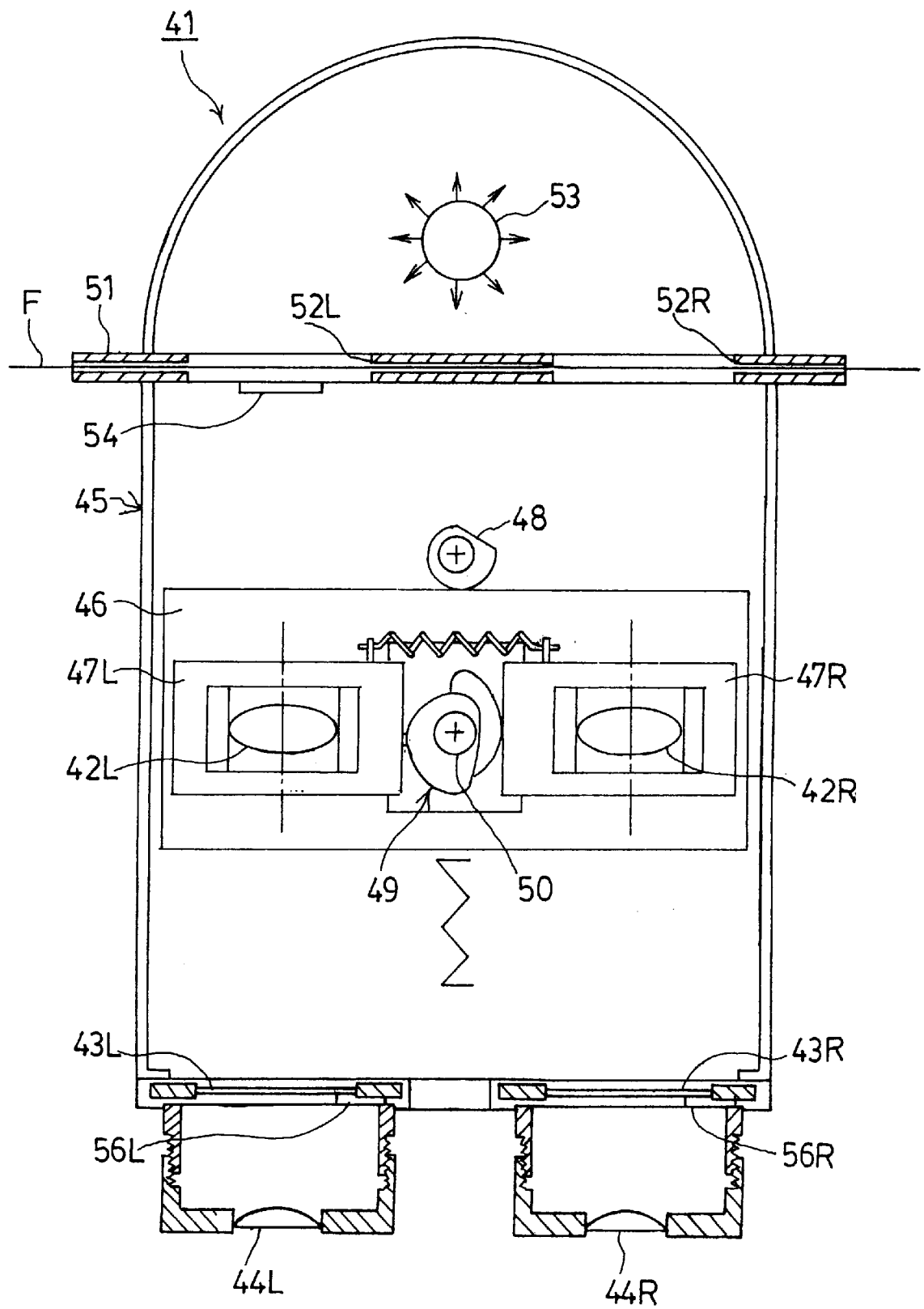

Fig. 13

Chart 2

| GUIDE # | Projection Magnification Ratio $r$ | Width of Projected Picture |
|---|---|---|
| 0 | 1.00 | 32.00 |
| 1 | 1.01587 | 32.50794 |
| 2 | 1.03226 | 33.03226 |
| 3 | 1.04918 | 33.57377 |
| 4 | 1.06667 | 34.13333 |
| 5 | 1.08475 | 34.71186 |
| 6 | 1.10345 | 35.31034 |

Fig. 14

Chart 3

| GUIDE # | Projection Magnification Ratio $r_a$ | Width of Projected Picture |
|---|---|---|
| 0 | 0.95313 | 30.500 |
| 1 | 0.96826 | 30.984 |
| 2 | 0.98388 | 31.484 |
| 3 | 1.00 | 32.000 |
| 4 | 1.01667 | 32.534 |
| 5 | 1.03390 | 33.084 |
| 6 | 1.05173 | 33.655 |

Fig. 15

Chart 4

| Photographing Distance | GUIDE # | Projection Magnification Ratio $\gamma a$ | Width of Projected Picture |
|---|---|---|---|
| Infinite | 3 | 1.00 | 32.000 |
| | 2 | 0.98388 | 31.484 |
| | 1 | 0.96826 | 30.984 |
| | 0 | 0.95313 | 30.500 |
| | 1 | 0.96826 | 30.984 |
| | 2 | 0.98388 | 31.484 |
| Minimum | 3 | 1.00 | 32.000 |

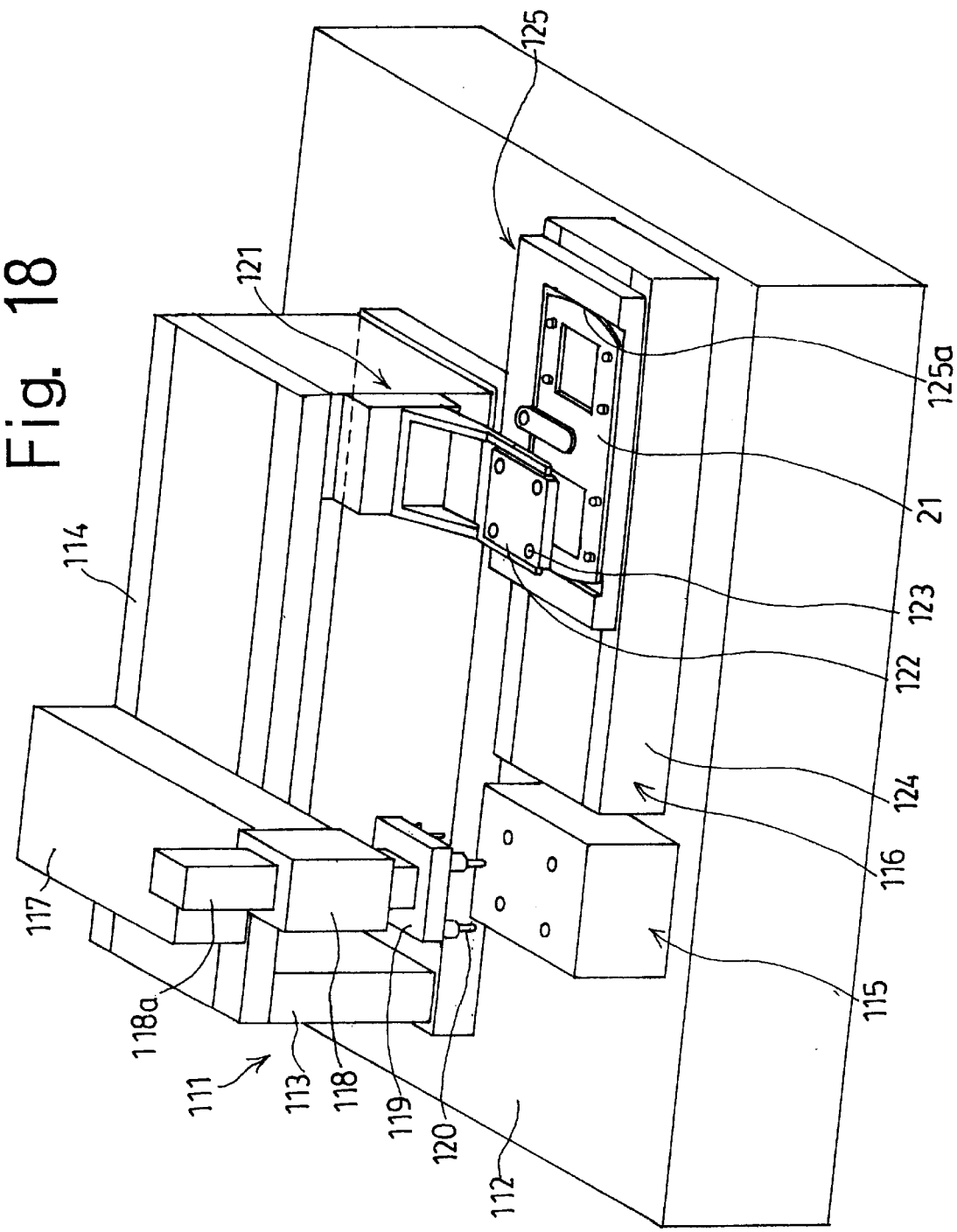

Fig. 22L
Fig. 22R
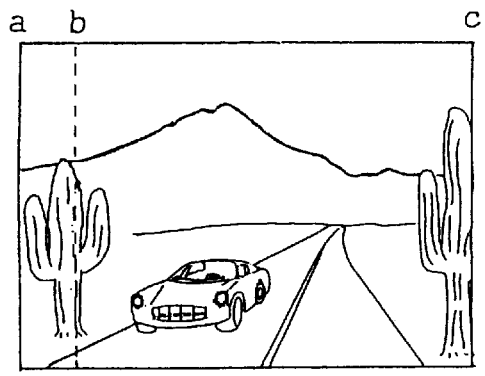
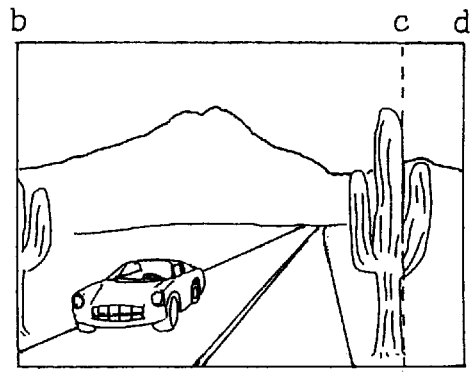
Fig. 23
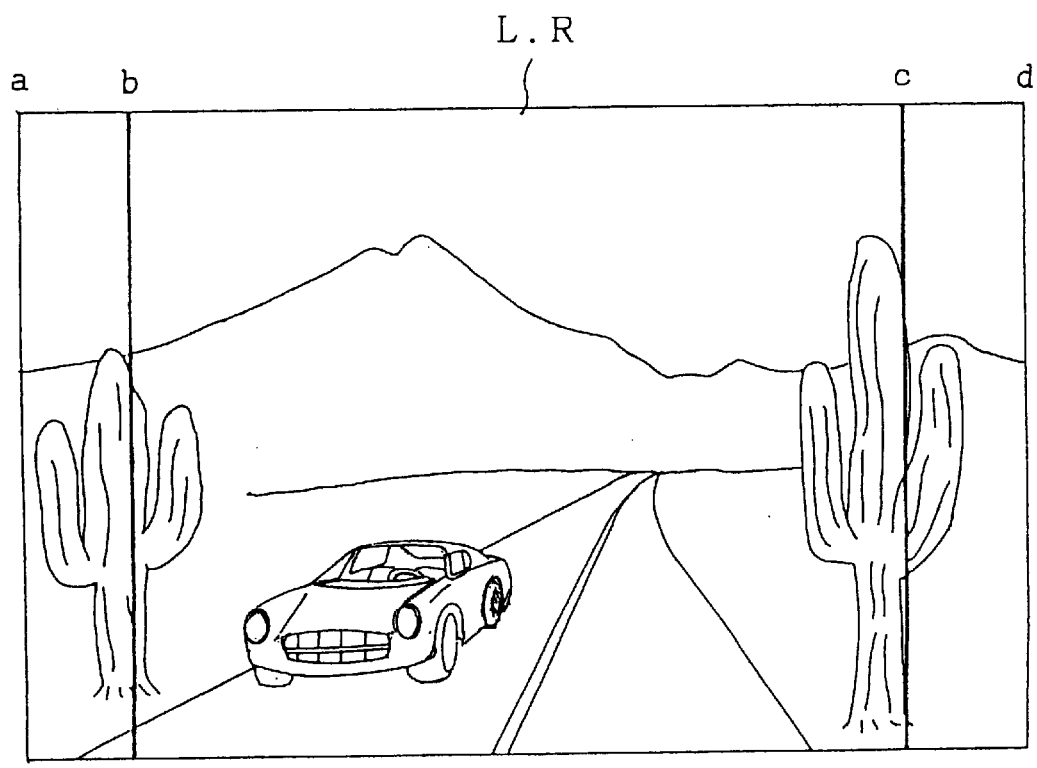

STEREO CAMERA

BACKGROUND OF THE INVENTION

1. Field of the Invention

The present invention relates to a stereo camera and, particularly, to a stereo camera which decreases losses in the right and left pictures.

2. Description of the Prior Art

In most of the conventional stereo cameras, the distance between the optical axes of the right and left photographing lenses has been set to be nearly the same as the distance between the centers of the right and left pictures. Therefore, the photographing ranges of the right and left pictures are brought into agreement with each other at an infinite point but become out of agreement as the photographing distance becomes shorter than an infinite point. Separate ranges (a–b) and (c–d) are photographed on the outer edge of the left picture of FIG. 22L and on the outer edge of the right picture of FIG. 22R, and the areas of the non-overlapped portions (a–b) and (c–d) become the greatest at the shortest photographing distance.

The non-overlapped portions of the stereo photography do not contribute to forming a stereo image when the films are viewed using a stereo slide viewer. When a stereo photograph taking a picture of a subject at a distance closer than an infinite point is mounted on a stereo slide mount for viewing the whole picture of the films, vertical lines appear at boundaries b and c between the overlapped portions and the non-overlapped portions where the edges of the other windows are overlapped when the stereo photography is viewed by both eyes impairing the interest. Usually, therefore, the non-overlapped portions of the films are masked by using a stereo slide mount having a width of windows narrower than the width of pictures of the films.

FIG. 24 shows a stereo slide mount 1 having a structure in which reversal films are sandwiched and held by a base frame 2 and a cover frame 3 having the same shape on a plane. The lateral width Ww of the left window 4L and the right window 4R is narrower than the width of pictures of the films to mask the non-overlapped portions formed on the pictures of the films at the shortest photographing distance. As shown, the films FL and FR photographing a subject at a short distance are mounted being offset outward relative to the windows 4L and 4R of the stereo slide mount 1 in order to mask the non-overlapped portions (a–b) and (c–d) shown in FIG. 23.

In the films which contain a subject at a distance and a subject in a close range, it is desired to correct the perspective feeling by adjusting the offset amount of the films in the lateral direction with respect to the windows of the stereo slide mount, so that the distance between the pictures of the subject (particularly, between the pictures of the subject in a close range) that most seriously affects the matching between the right and left pictures becomes equal to, or greater than, the distance Pw between the centers of the right and left windows of the stereo slide mount.

In the case of a stereo photography taking a picture of a subject at an infinite point, on the other hand, the photographing ranges of the pictures are nearly in agreement between the right film and the left film, and there is no need to mask the pictures. In practice, however, as shown in FIG. 25, both sides of the pictures of the right and left films FR, FL are masked by the windows 4R and 4L of the stereo slide mount, and the pictures are lost to a large extent.

In the past, there used to exist a stereo camera in which the distance between the optical axes of the right and left photographing lenses was narrowly set so that the photographing ranges of the right and left pictures were brought into agreement with each other at the shortest photographing distance contrary to the above-mentioned stereo camera. With this camera, however, non-overlapped portions are formed in which the photographing ranges are not brought into agreement on the insides of the right and left pictures when a subject at an infinite point is short contrary to the above-mentioned stereo camera. When a subject at an infinite point is shot, therefore, the non-overlapping portions of the inner sides must be masked by offsetting the right and left films toward the inside contrary to the films shown in FIG. 24. When a subject at the closest distance is shot, the mounting positions of the films need not be offset; i.e., the films are mounted in a state as shown in FIG. 25, and the pictures are lost in amounts same as that of the above-mentioned stereo camera.

In order to decrease the loss of the pictures, the present applicant has proposed a stereo camera in which the distance between the optical axes of the right photographing lens and the left photographing lens is automatically adjusted as well as a stereo camera in which the distance between the optical axes is manually adjusted. According to these stereo cameras of the type in which the distance between the optical axes is varied, the photographing ranges of the right and left pictures are brought into agreement over the whole photographing distances to suppress the occurrence of non-overlapped portions where the right and left pictures are not overlapped one upon the other. It is therefore allowed to decrease the loss of pictures by selecting the width of windows of the stereo slide mount to be nearly equal to the width of pictures of the films. However, provision of the mechanism for adjusting the distance between the optical axes causes the constitution of the stereo camera to become complex and inevitably drives up the cost.

Thus, there arouses a technical assignment that must be solved for decreasing the loss of pictures as much as possible in a stereo camera of a simple structure in which the distance between the optical axes is fixed. The object of the present invention is to solve the above-mentioned problem.

SUMMARY OF THE INVENTION

In order to achieve the above-mentioned object, the present invention provides a stereo camera equipped with right and left two photographing lenses, wherein the distance between the optical axes of the right and left photographing lenses is set at nearly midway between a distance equal to the distance between the centers of the right and left pictures and a distance between the optical axes at which the photographing ranges of the right and left photographing lenses come into agreement with each other at the shortest photographing distance. The invention further provides a stereo camera equipped with right and left two photographing lenses, wherein the distance between the optical axes of the right and left photographing lenses is set to lie in a range between a distance shorter by 1.2 mm than the distance between the centers of the right and left pictures and a distance between the optical axes at which the photographing ranges of the right and left photographing lenses come into agreement with each other at the shortest photographing distance.

BRIEF DESCRIPTION OF THE DRAWINGS

FIGS. 2L and 2R are views illustrating the pictures of when a subject at an infinite point is photographed by using the stereo camera of FIG. 1;

FIGS. 3L and 3R are views illustrating the pictures of when a subject at the shortest distance is photographed by using the stereo camera of FIG. 1;

FIG. 7 is a chart of window widths of the stereo slide mounts and the photographing distances of the stereo camera;

FIG. 12 is a plan view illustrating the internal structure of a device for detecting the amount of correcting the parallax;

FIGS. 13, 14 and 15 are charts showing the window widths of the stereo slide mounts and the projection magnifications of the device for detecting the amount of correcting the parallax;

FIG. 18 is a perspective view of a mount-forming device;

FIGS. 22L and 22R are diagrams illustrating the loss of pictures in a stereo camera according to a prior art;

FIG. 23 is a diagram illustrating a state where the pictures of FIG. 22 are three-dimensionally viewed;

FIG. 24 illustrates a prior art, wherein

DESCRIPTION OF THE PREFERRED EMBODIMENTS

Figure 1:
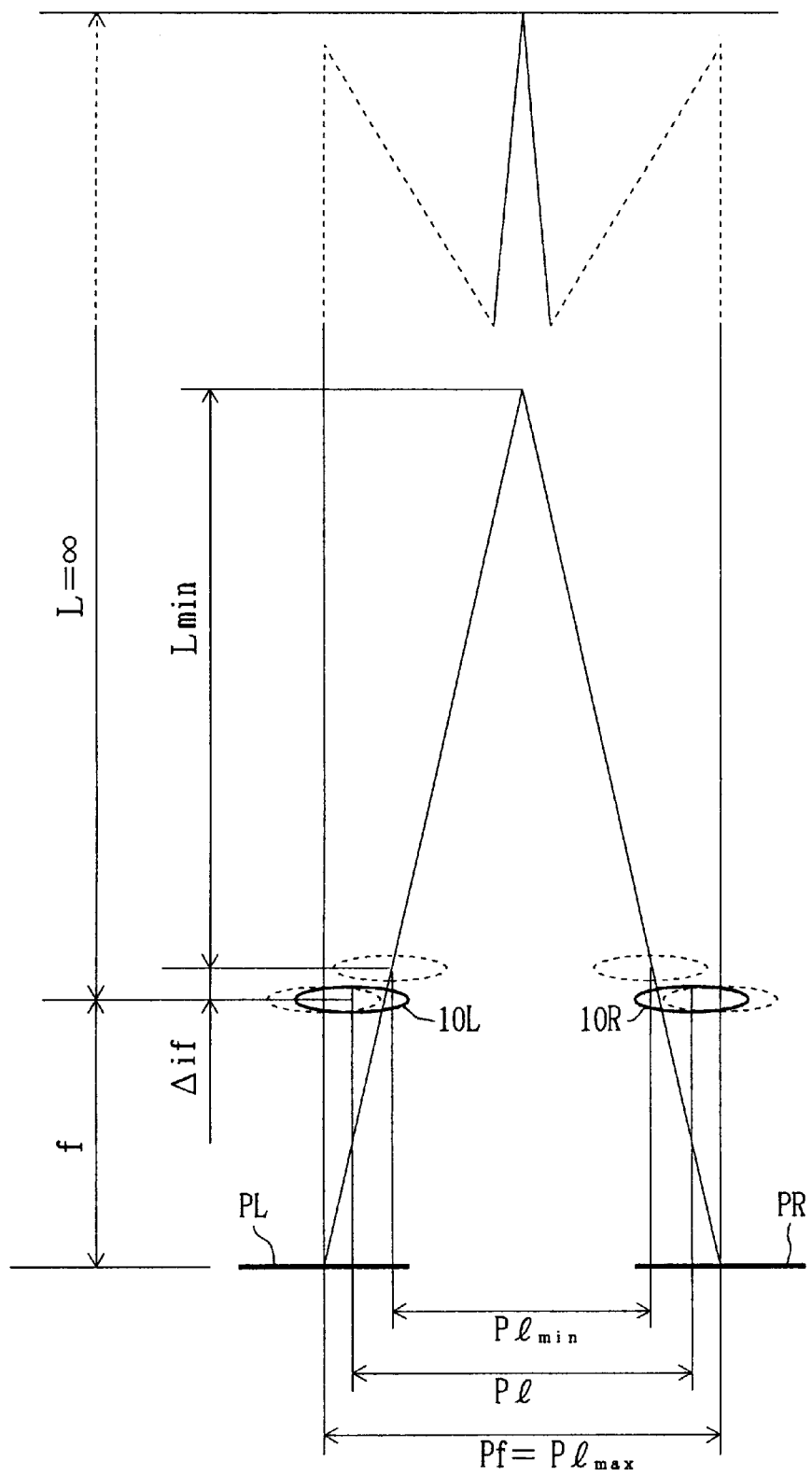
FIG. 1 is a diagram illustrating the distance between the optical axes of a stereo camera.

Embodiments of the present invention will now be described with reference to the drawings. FIG. 1 is a diagram illustrating the distance between the optical axes of right and left photographing lenses 10R, 10L of a stereo camera, wherein the distance Pl between the optical axes is set at nearly midway between the distance $Pl_{max}$ at which the photographing ranges of the right and left photographing lenses come into agreement with each other at an infinite point and the distance $Pl_{min}$ at which the photographing ranges of the right and left photographing lenses come into agreement with each other at the shortest photographing distance.

Therefore, the photographing ranges of the right and left pictures PR and PL come into agreement with each other nearly at intermediate point in a range of delivery of the photographing lenses 10L and 10R. There develop non-overlapped portions (A–B, C–D) on the outer sides of the right and left pictures when a subject at a short distance is photographed as shown in FIG. 2, and there develop non-overlapped portions (A–B, C–D) on the inner sides of the right and left pictures when a subject at an infinite point is photographed as shown in FIG. 3. The areas of the non-overlapped portions become a maximum on the pictures of when the subject at the shortest distance is photographed and on the pictures of when the subject at an infinite point is photographed.

However, the maximum areas of the non-overlapped portions are decreased to one-half that of the non-overlapped portions (A–B, C–D) of when the subject at the shortest distance is photographed by using a conventional stereo camera shown in FIG. 22. Therefore, the loss of pictures due to the masking can be halved by using a stereo slide mount having a width of window broader than that of the conventional stereo slide mount and having a picture-masking amount which is one-half that of the prior art.

Described below with reference to FIG. 1 is how to set the distance between the optical axes.

Let it now be assumed that:

distance to the subject—L, focal distance of the photographing lens—f, amount of movement of the lens in the direction of optical axis due to the adjustment of the focal point—Δif, distance between the optical axes of the right and left photographing lenses—Pl, distance between the centers of the right and left pictures—Pf, distance between the centers of the pictures of a subject at a focal distance—$Pi_1$, focal distance of the photographing lens f=36 (mm), and, distance between the centers of the right and left pictures Pf=pitch between perforations in the film×14=4.735× 14=66.29 (mm).

When the distance L to the subject is infinite, light from an infinite point falls in parallel with the optical axes of the right and left photographing lenses 10R and 10L. Therefore, the photographing ranges of the right and left photographing lenses come into agreement with each other at a distance $Pl_{max}$ (66.29 mm) at which the distance between the optical axes of the right and left photographing lenses becomes equal to the distance Pf between the centers of the right and left pictures.

The distance Pl between the optical axes of the right and left photographing lenses is calculated as, moving amount of the lens in the direction of optical axis Δif=f²/(L−f), projection magnification of the lens r=(Δif+f)/L=Δif/f, $$Pl=Pi_1/(1+r),$$

from which, $$\Delta if=36^2/(500-36)=2.7931 \text{ (mm)},$$

$$r=2.7931/36=0.07759,$$

if the shortest photographing distance of the photographing lens is 500 mm.

The distance between the optical axes at which the photographing ranges of the right and left photographing lenses come into agreement with each other at this photographing distance, i.e., the distance $Pl_{min}$ at which the distance $Pi_1$ between the centers of the pictures of the subject at the shortest focal distance comes into agreement with the distance Pf (66.29 mm) between the centers of the right and left pictures, is given by, $$Pl_{min}=66.29/(1+0.07759)=61.517 \text{ (mm)}$$

Therefore, the loss of pictures can be halved at both a distance and a short distance in a range of adjusting the focal point if the distance between the optical axes is nearly brought to an intermediate value ((66.29+61.517)/2=63.9 mm) between the distance 66.29 mm at which the photographing ranges of the right and left photographing lenses come into agreement with each other at an infinite point and the distance 61.517 mm at which the photographing ranges of the right and left photographing lenses come into agreement with each other at the shortest photographing distance. Here, the distance between the optical axes need not be strictly brought to an intermediate value but may be freely set near the intermediate value. When the distance between the optical axes is set to be larger than the intermediate value, loss in the pictures decreases when shooting the subject at a distance but increases when shooting the subject at a short distance. Conversely, when the distance between the optical axes is set to be smaller than the intermediate value, the loss of pictures decreases when shooting the subject at a short distance but increases when shooting the subject at a distance.

Figure 4:
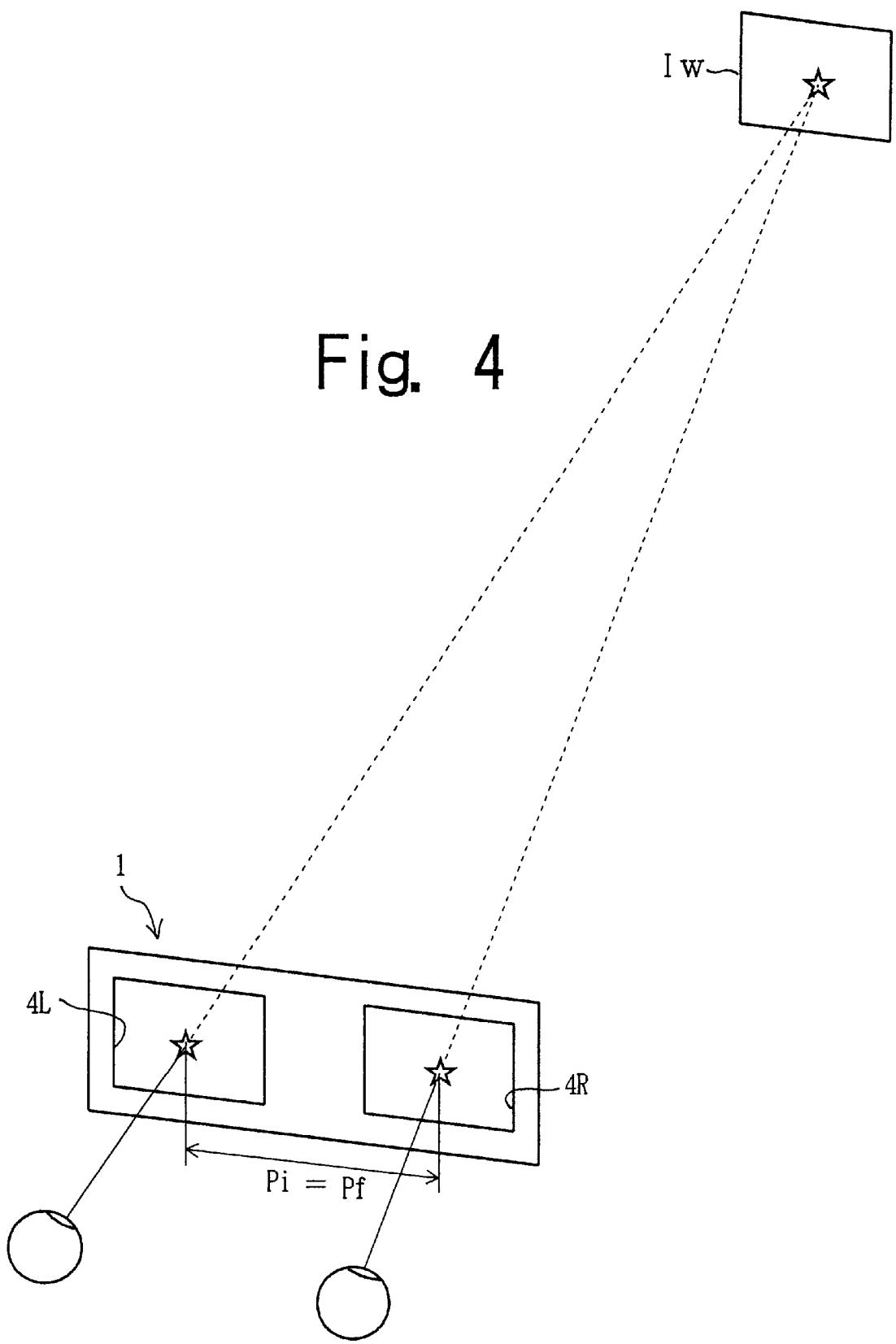
FIGS. 4 and 5 are diagrams illustrating the states where a stereo image of stereophotography is formed.
Figure 5:
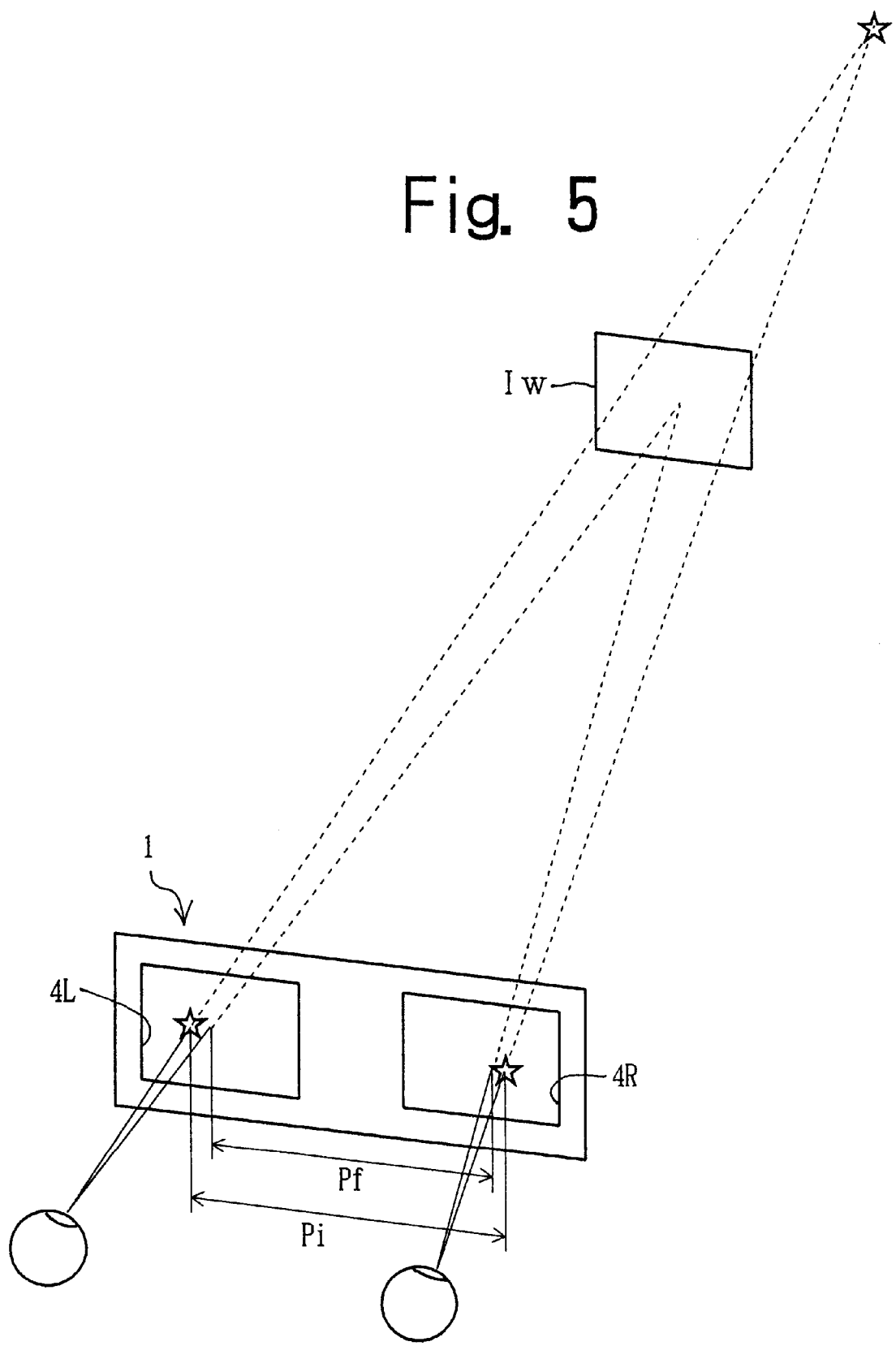

FIGS. 4 and 5 are diagrams illustrating a three-dimensional picture of a stereo slide. If the distance between the centers of the right and left windows 4R and 4L of the stereo slide mount 1 is denoted by Pf and the distance between the centers of the pictures of a subject at an infinite point on the right and left pictures by Pi, then, Pf=Pi in FIG. 4. Accordingly, the pictures of the subject and the stereo window Iw (imaginary window which appears to be one window as the right and left windows merge together in the three-dimensional view) are seen at an infinite point. A person will feel it natural if the stereo window Iw is seen at a distance closer than the pictures of the subject like when a person views the outdoor scenery through the window of a house, but will feel it unnatural if the stereo window Iw is seen at an infinite point.

FIG. 5 illustrates a state where the distance Pi between the centers of the right and left pictures of the subject is broadened to be larger than the distance Pf between the centers of the right and left windows, i.e., Pf<Pi to correct the parallax. The stereo window Iw is seen in a close range as the difference between Pf and Pi increases. However, limitation is imposed on increasing the distance Pi between the centers of the right and left pictures of the subject at an infinite point, i.e., Pi=Pf+1.2 (mm) at the greatest. An increase of the distance Pi in excess of the above limit causes an eyesore due to a congestion angle of the two eyes.

By decreasing the distance Pl between the optical axes of the right and left photographing lenses of the stereo camera to be shorter by more than 1.2 mm than the distance between the optical axes at which the photographing ranges of the right and left photographing lenses come into agreement at an infinite point (distance Pf between the centers of the right and left pictures), the distance $Pi_1$ between the centers of the pictures on the right and left pictures of the subject at an infinite point at the time of taking a picture, is photographed being shortened by 1.2 mm from the distance Pf between the centers of the right and left pictures (the pictures of the subject at an infinite point becomes $Pi_1$=Pl).

The picture that is photographed is an inverted image turned right side left and upside down. When the films are turned by 180 degrees and are mounted in the state of an erect image on the stereo slide mount, the distance Pi between the centers of the right and left pictures of the subject is expanded by more than 1.2 mm as shown in FIG. 5, whereby the parallax is corrected and the stereo window is seen closer than about 2 meters.

Under the conditions where the distance is Pf=66.29 mm between the centers of the right and left pictures and the shortest photographing distance of the photographing lens is 500 mm as described above, therefore, the loss of pictures can be decreased to be smaller than that of the conventional stereo cameras if the distance Pl between the optical axes of the right and left photographing lenses is set to lie within a range of 61.517<Pl<(66.29−1.2)(mm).

In the above-mentioned stereo camera, the loss of pictures is decreased by using a stereo slide mount having a predetermined width of windows. By using the stereo slide mounts having several kinds of widths of windows, however, the loss of pictures can be minimized at any photographing distance.

Figure 6:
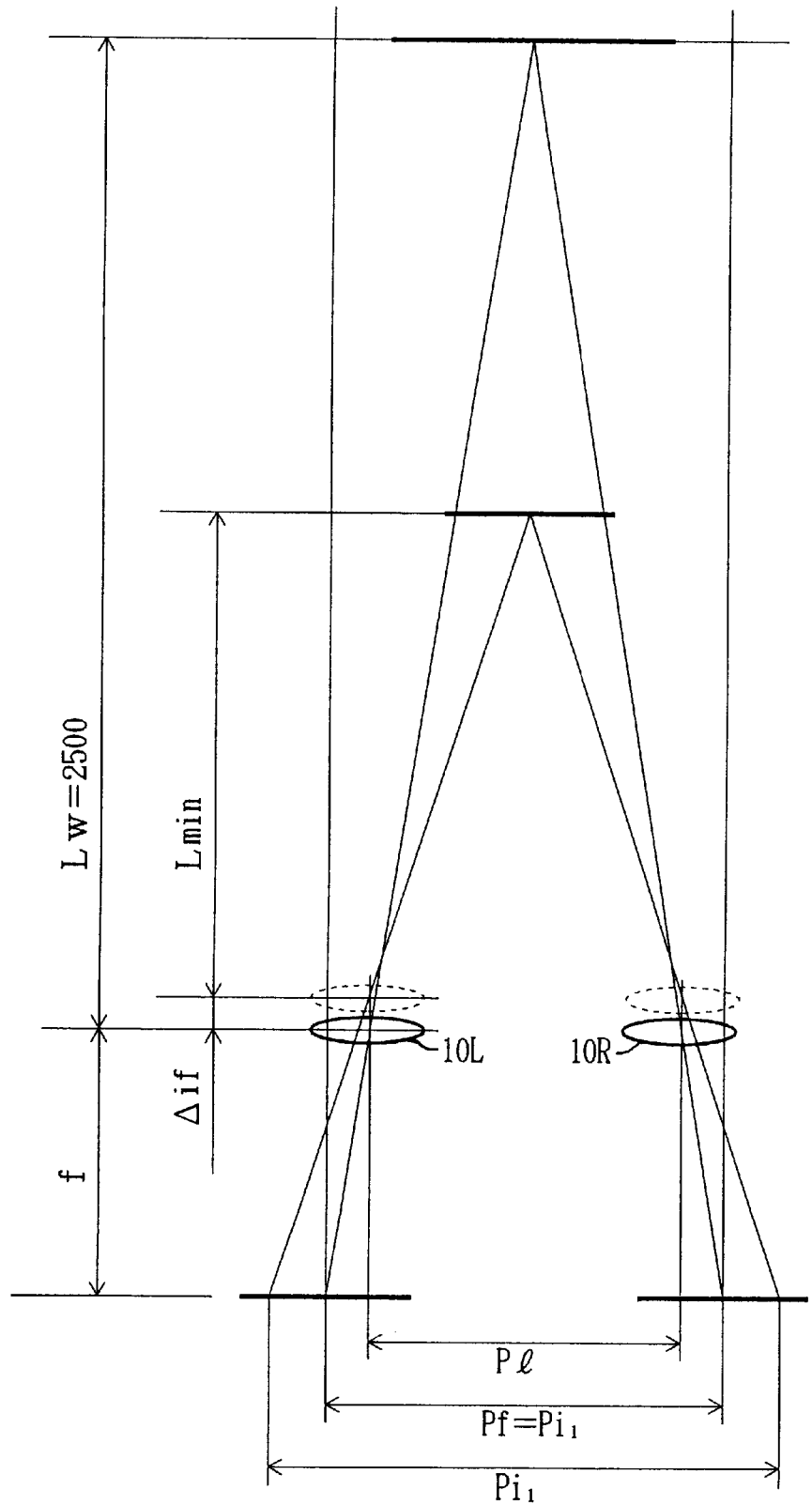
FIG. 6 is a diagram illustrating the distance between the optical axes of a stereo camera.

In FIG. 6, for example, if, distance between the centers of the right and left pictures Pf=66.29 mm, focal distance of the photographing lens f=36 mm, distance to the stereo window when shooting a subject at an infinite point Lw=2500 mm, then, the distance Pl between the optical axes of the right and left photographing lenses 10R and 10L maintains a relationship, projection magnification of the lens r=Δif/f=(Δif+f)/L, $$Pl=Pf/(1+r).$$

Since Δif=0 when shooting the subject at an infinite point, then, $$Pl=Pf/(1+r)=66.29/(1+36/2500)=65.349 \text{ (mm)}.$$

If the focal point is adjusted to an infinite point under these conditions, the distance $Pi_1$ between the centers of the right and left pictures of the subject at a photographing distance of 2.5 m becomes 66.29 mm which is equal to the distance Pf between the centers of the right and left pictures. Therefore, the image photographed at a distance of 2.5 m is seen at a distance equal to the stereo window located at a distance of 2.5 m, and the photographed image farther than 2.5 m is seen farther than the stereo window.

When the right and left photographing lenses 10R and 10L are moved forward along their optical axes to bring the focal point on a subject at a short distance, the distance between the centers of the pictures of a body at the focal distance becomes $Pi_1$ which is larger than Pf, and the offset amount of the films for correcting the parallax at the time of mounting the films on the stereo slide mount becomes $(Pi_1-Pf)/2$ for one film.

Therefore, the width of windows of the stereo slide mount must be decreased to be smaller than the width Pf of pictures of the films by an amount $(Pi_1-Pf)$ so as to mask the outer sides (inner sides in FIG. 6) of the pictures of the films and so that the edges on the inner sides of the pictures will not appear in the windows. When, for example, $(Pi_1-Pf)/2$ is 0.25 mm, the amount of decreasing the width of the windows of the stereo slide mount is 0.5 mm.

If the projection magnification of the photographing lenses 10R and 10L is denoted by r, then, the focal distance L at which the stereo window Iw is seen at a distance equal to the subject under the condition where the width of windows of the stereo slide mount is decreased by 0.5 mm, is given by, $$r=(Pi_1-Pl)/Pl,$$

$$\Delta if = f \times r,$$

$$L=(\Delta if+f)/r.$$

If now the amount of decreasing the width of windows is denoted by Rw, then, $$r=(Pi_1-Pl)/Pl=(Pf+Rw-Pl)/Pl.$$

If Rw=0.5, then, $$r=(66.29+0.5-65.349)/65.349=0.022051,$$

$$\Delta if=36\times0.022051=0.79383,$$

$$L=(0.79383+36)/0.022051=1669 \text{ (mm)}.$$

When the films shot by using the above-mentioned stereo camera are mounted on the stereo slide mount having a width of windows narrower by 0.5 mm than the width of pictures of the films, and are offset to a maximum degree, i.e., when the films are mounted by bringing the vertical edges on the inner sides of the pictures of the films into agreement with the vertical edges on the inner sides of the windows of the slide mount, then, the stereo window can be seen at a distance equal to the picture of the subject at a distance of 1669 mm.

When the amount of decreasing the width of the windows is Rw=1 mm, $$r=(66.29+1.0-65.349)/65.349=0.02970,$$

$$\Delta if=36\times0.02970=1.0692,$$

$$L=(1.0692+36)/0.02970=1248 \text{ (mm)},$$

and the stereo window is seen at a distance equal to the picture of the subject at a distance of 1248 mm.

Therefore, the films shooting the subject at a distance farther than 2500 mm using a stereo camera having a distance between the optical axes of 65.349 mm should be mounted on a stereo slide mount having a width of windows equal to the width of pictures, the films shooting the subject at a distance of from 2499 mm to 1669 mm should be mounted on a stereo slide mount of which the width of windows is decreased by 0.5 mm, and the films shooting the subject at a distance of from 1698 mm to 1248 mm should be mounted on a stereo slide mount of which the width of windows is decreased by 1 mm. Then, the parallax is property corrected, and the subject at a focal distance is seen farther than the stereo window.

A chart of FIG. 7 illustrates the stereo slide mounts of seven stages in which the width of windows of the stereo slide mount are decreased starting from 32 mm in a unit of 0.5 mm in relation to the photographing distances of a stereo camera having the above-mentioned distance between the optical axes to cope with the stereo camera in which the width of photographing windows is 32 mm.

If the films are mounted by selecting a stereo slide mount that corresponds to the photographing distance out of the seven stages of stereo slide mounts, the loss of pictures becomes a minimum but it becomes necessary to make sure the photographing distance of the pictures of the films in selecting the stereo slide mount. This problem can be solve by providing the stereo camera with a means for recording data related to the photographing distance outside the pictures of the films.

Figure 8:
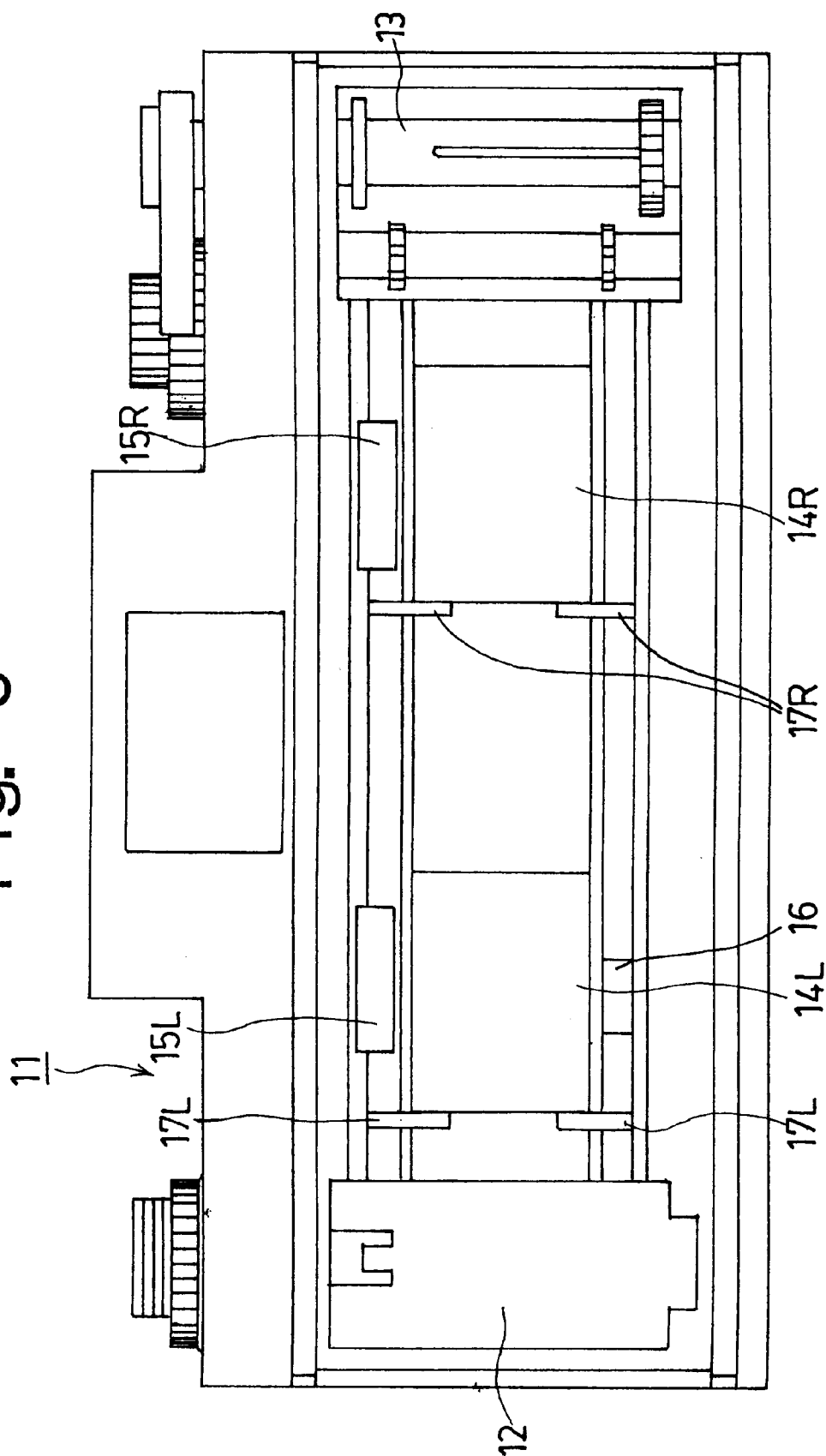
FIG. 8 is a back view of the stereo camera from which a back closure is removed.

FIG. 8 illustrates a state where a back closure is removed from the stereo camera 11. Like in an ordinary camera, a 135-type film is fitted into a Patrone-loading chamber 12 at the left end of the body, and an end of the 135-type film is anchored to a film take-up shaft 13 at the right end to take up the film on the film take-up shaft 13. A pair of right and left photographing windows 14R and 14L are provided between the Patrone-loading chamber 12 and the film take-up shaft 13.

Number-recording units 15L and 15R are provided over the photographing windows 14L and 14R to record a frame number and right and left discrimination characters on the films outside the pictures. A distance data-recording unit 16 is provided under the left photographing window 14L to record data related to the photographing distance based on the amount of adjusting the focal points of the photographing lenses 10L and 10R. Furthermore, index-recording units 17L and 17R are provided on the left sides of the photographing windows 14L and 14R to record vertical lines that serve as targets for cutting on the gaps among the pictures of the films.

The recording units 15, 16 and 17 expose the films to the lines and characters by using LED's that emit light being interlocked to the shutter. Like a general date-recording device, they may be provided on the back closure of the stereo camera to expose the films to light from the back surface.

The data related to the photographing distances may be found from the amount of delivering the photographing lenses by providing an electric position detector (not shown) for detecting the amount of delivering the photographing lenses 10L and 10R, or, in the case of a stereo camera of the automatic focusing type, may be found from the distance measurement data measured by a distance-measuring circuit. A guide number (#0, #1, - - - , #6) of a stereo slide mount corresponding to the data of a photographing distance found from the collation chart of FIG. 7 is recorded on the films. Concretely, the guide number is indicated by the number of vertical lines, and the vertical lines of a number same as the guide number are recorded.

Figure 9:
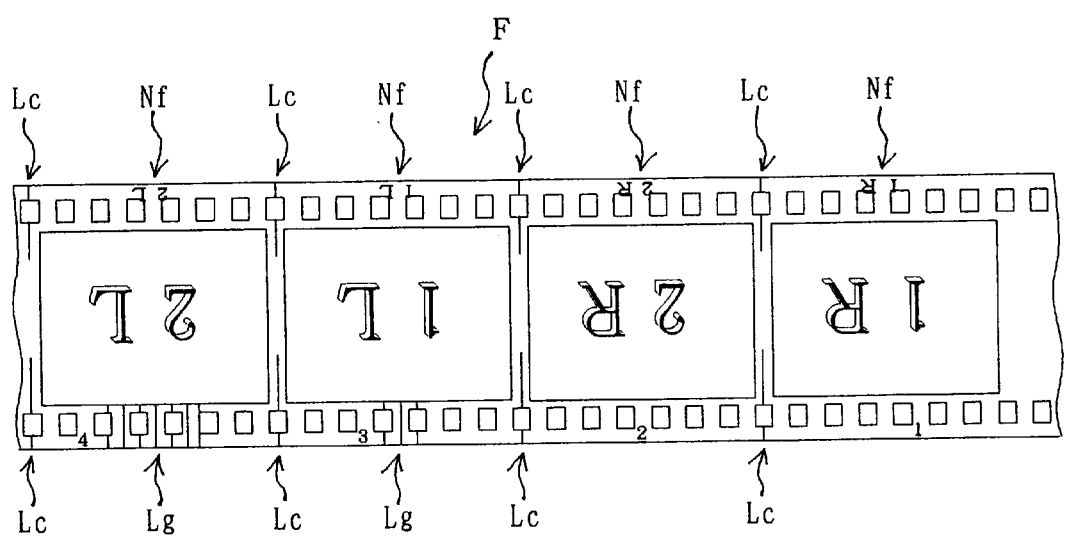
FIG. 9 is a front view of a film strip photographed by using the stereo camera of the present invention.

FIG. 9 shows a film strip F photographed by using the stereo camera 11. Frame numbers Nf are recorded on the edge of the upper side of the pictures in order of 1R, 2R, 1L, 2L, - - - . On the edge of the lower side, guide numbers of the stereo slide mounts corresponding to the photographing distances are indicated by using zero to six vertical lines Lg. On the gaps among the pictures of the film, there are recorded targets for cutting the film as well as vertical lines Lc that serve as positioning index in the device for detecting the amount of correcting the parallax that will be described later.

The pictures projected onto the film through the lenses of the stereo camera 11 are inverted upside down and right side left as viewed from the back surface side of the camera. The films, therefore, are mounted on the stereo slide mount being turned by 180 degrees to create an erect image. When mounted, therefore, the frame number is positioned on the lower edge and the distance data is positioned on the upper edge. However, no limitation is imposed on these positions.

Figure 10A:
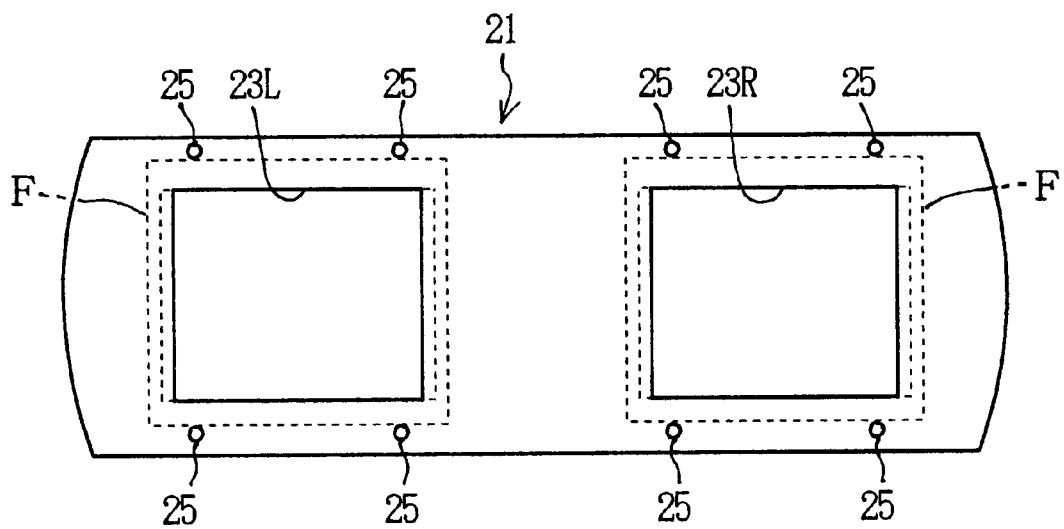
FIG. 10a is a front view of a base frame of the stereo slide mount.
Figure 10B:
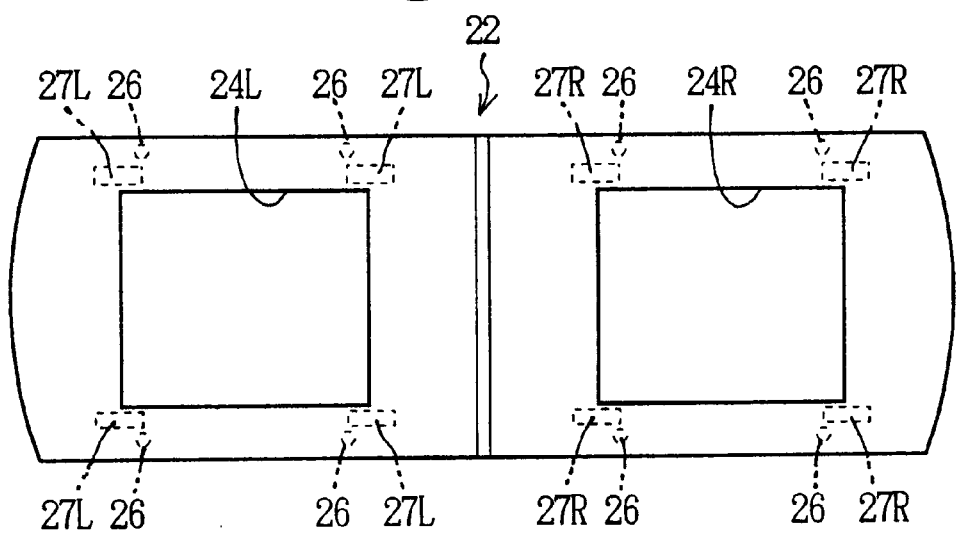
FIG. 10b is a front view of a cover frame.

FIG. 10 shows a stereo slide mount constituted by a base frame 21 and a cover frame 22. Right and left windows 23R, 23L and 24R, 24L are formed in the base frame 21 and in the cover frame 22 obtained by injection-molding a resin. A pitch between the windows 23R and 23L, and between the windows 24R and 24L, is set to be about 63 mm, which is close to the pitch between two human eyes. The vertical and lateral size of the windows 23R, 23L, 24R, 24L is 24×32 (mm) which is the same as the size of the photographing windows of the stereo camera 11, enabling the whole pictures of the films to be seen.

Cylindrical pins 25 are stud at upper, lower, right and left four places of each of the windows 23R, 23L of the base frame 21. The distance between the upper and lower pins 25 is the same as the width of the film F in the up-and-down direction. When the film F is inserted between the upper and lower positioning pins 25, the centers of the windows 23R, 23L of the base frame 21 in the up-and-down direction comes into agreement with the centers of the pictures of the films F in the up-and-down direction.

In the cover frame 22 are formed pin holes 26 at positions symmetrical to the pins 25 of the base frame 21. By fitting the pins 25 into the pin holes 26, the base frame 21 and the cover frame 22 are coupled together.

At four corners surrounding the windows 23R, 23L of the base frame 21, there are formed protuberances by using a protuberance-forming device that will be described later for engagement with perforations of the films. In order to avoid interference by the protuberances formed on the base frame 21, therefore, there are formed recessed portions 27R, 27L in the back surface (that comes into contact with the base frame) at four corners surrounding the windows 24R, 24L of the cover frame 22.

A grooved hinge portion 22a is formed in the vertical direction at the center of the cover frame 22 in the right-and-left direction, so that the cover frame 22 can be folded at the center. The films are placed on the right and left windows of the base frame 21. The left portion of the cover frame 22 folded at the center is superposed thereon so that the positioning pins 25 are fitted into the pin holes 26. Then, in the same manner, the right portion of the cover frame 22 is fitted to the base frame 21 thereby to couple the base frame 21 and the cover frame 22 together.

Figure 11A:
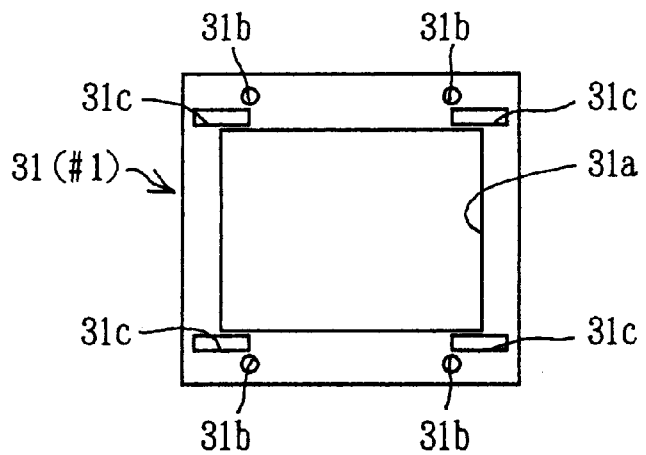
FIGS. 11a, 11b and 11c are front views of framing masks.
Figure 11B:
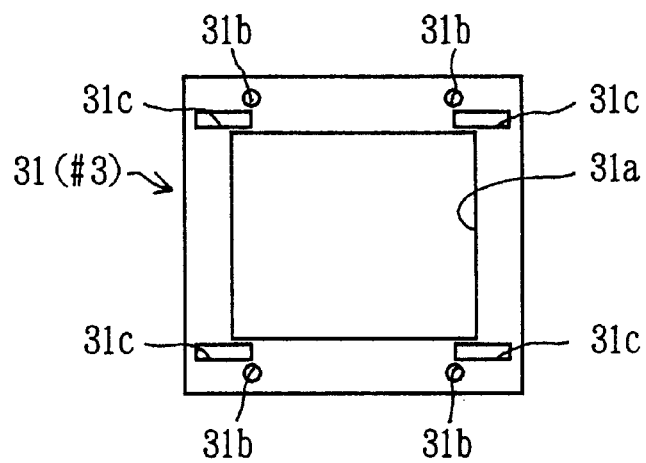
Figure 11C:
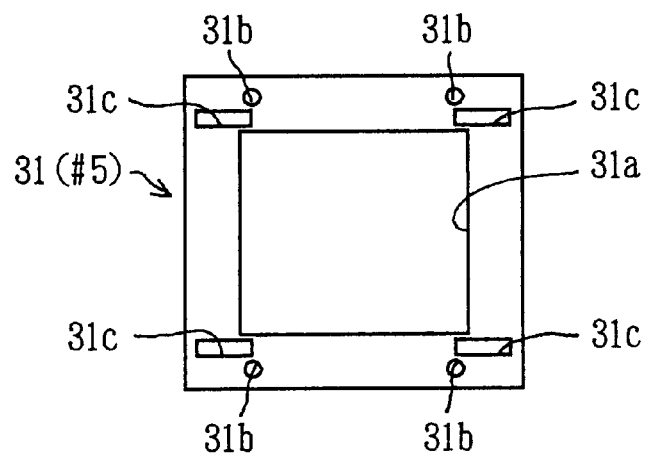

In the above-mentioned stereo slide mount, the width of windows is adjusted by using a framing mask 31 shown in FIG. 11. The framing mask 31 is formed by punching a window 31a in the light-shielding material such as a paper or a black resin film, and has a width in the up-and-down direction larger than the width of the film, and has holes 31b at right and left ends on the upper and lower sides for engagement with the pins 25 of the base frame 21 shown in FIG. 10. Referring to FIG. 11, rectangular holes 31c are perforated at four corners of the window 31a of each framing mask 31. The four holes 31c are located at positions corresponding to the recessed portions 27R and 27L in the cover frame 22 shown in FIG. 10(b) to avoid interference with the protuberances P formed on the base frame 21 by a mount-forming device 111 that will be described later.

FIG. 11 shows three kinds of framing masks 31, i.e., #1, #2 and #5 having different widths of windows. In practice, however, there are six kinds (#1 to #6) of framing masks 31, and the widths of windows of these six kinds of framing masks 31 are corresponding to the widths of windows of the guide numbers #1 to #6 in the chart of FIG. 7.

The window 31a of each framing mask 31 has a fixed central position, and the distance between the centers of the windows 31a of the right and left framing masks 31 remains constant irrespective of the guide number of the framing masks 31 mounted on the base frame 21.

The operation for mounting the films on the stereo slide mount can be correctly carried out by using a device 41 for detecting the amount of correcting the parallax shown in FIG. 12.

The device 41 for detecting the amount of correcting the parallax includes right and left optical systems comprising projection lenses 42R, 42L, focusing plates 43R, 43L having collimation patterns, and eyepieces 44R, 44L. A main slider 46 arranged at an intermediate portion in the back-and-forth direction of a frame 45 is allowed to slide in the direction of optical axes of the projecting lenses 42L, 42R. Right and left lateral sliders 47R, 47L mounted on the main slider 46 are allowed to freely slide in the lateral direction, and the projection lenses 42R and 42L are separately mounted on the right and left lateral sliders 47R and 47L.

The main slider 46 is slid back and forth by a projection magnification-adjusting cam 48 driven by a motor (not shown). A cam 49 for adjusting the distance between the optical axes sandwiched between the right and left lateral sliders 47R and 47L, is constituted by two pieces of cams of the same shape which are secured onto a shaft 50 with their phases being shifted by 180 degrees relative to each other. The right and left lateral sliders 47R and 47L are pushed by a spring onto the cam 49 for adjusting the distance between the optical axes. When a knob (not shown) fitted to the shaft 50 of the cam 49 for adjusting the distance between the optical axes is turned, the gap between the right and left lateral sliders 47R and 47L increases or decreases, making it possible to adjust the distance between the optical axes of the right and left projection lenses 42R and 42L.

A film holder 51 secured to a rear part of the frame 45 guides the film strip of stereo photography after developing, and a pair of pictures of stereo photography are exposed through the right and left windows 52R and 52L. A lighting bulb 53 is disposed at the back of the film holder 51. Pictures of films in the right and left windows 52R and 52L of the film holder 51 are focused on the focusing plates 43R and 43L through the projecting lenses 42R and 42L, so that the stereo photography can be viewed in a three-dimensional manner through the right and left eyepieces 44R and 44L.

An image sensor 54 (e.g., CCD image sensor, position sensitive detector using a photodiode, etc.) is disposed under the left window 52L of the film holder 51 to read the data of distance recorded under the left picture of the film. A control unit (not shown) moves the main slider 46 by controlling a motor that drives a cam for adjusting the projection magnification, in order to set a projection magnification corresponding to the data of distance.

A chart of FIG. 13 shows projection magnifications of when the lateral width of the focusing plate is equal to the width of picture of the film. For example, the projection magnification for the framing mask #2 is 1.03226 at which the width of the projected picture is 33.03226 exceeding toward the right and left beyond the focusing plate by 0.516 mm, respectively. This is the same masking ratio as when the picture having a lateral width of 32 mm is masked with the framing mask #2 having a lateral width of 31 mm.

In a structure in which the projection magnification is changed by moving the projection lenses only but securing the focusing plates and the film holder, the precision of focal point can be easily maintained throughout the whole range if the projection magnification is set to one time at an intermediate point in the range for adjusting the projection magnification. FIG. 14 is a chart of when the projection magnification of one time is set at an intermediate point in the range for adjusting the projection magnification, i.e., when the projection magnification of #3 is set to one time. As shown, the projection magnification for, for example, #0 is 0.95313. The width of the practically projected picture is 30.500 mm. Therefore, if the lateral width of the focusing plate is set to be 30.500 mm, then, the amount of masking the pictures of the films #0 projected onto the focusing plates becomes zero. The projection magnification for, for example #3 is 1.0, and the width of the projected picture becomes 32.00 mm exceeding toward the right and left beyond the focusing plates by 0.75 mm, respectively. This is the same as when the picture having a lateral width of 32 mm is masked with the framing mask #3 having a lateral width of 30.5 mm in the chart of FIG. 13.

The amount of masking the pictures becomes the greatest at both ends of the range of photographing distances rather than at an intermediate point of the range of photographing distances in the stereo camera mentioned first in which the distance between the optical axes of the right and left photographing lenses is set to nearly midway between the distance equal to a distance between the centers of the right and left photographed pictures and the distance between the optical axes at which the photographing ranges of the right and left photographing lenses come into agreement with each other at the shortest photographing distance, and in the stereo camera in which the distance between the optical axes of the right and left photographing lenses is set to lie in a range between a distance shorter by 1.2 mm than the distance between the centers of the right and left photographed pictures and the distance between the optical axes at which the photographing ranges of the right and left photographing lenses come into agreement with each other at the shortest photographing distance.

A chart of FIG. 15 is for collating the guide numbers of the framing masks and the projection magnifications of a stereo camera in which the distance between the optical axes of the right and left photographing lenses is set to be nearly midway between the distance equal to a distance between the centers of the right and left photographed pictures and the distance between the optical axes at which the photographing ranges of the right and left photographing lenses come into agreement with each other at the shortest photographing distance. As shown, at an intermediate point in the range for adjusting the focal point, no masking is required (#0) by the framing mask, and the numbers of the framing masks increase as they separate away therefrom. In this stereo camera, therefore, the guide number recorded on the film may be corresponded to the photographing distance and the projection magnification of this chart.

Figure 16A:
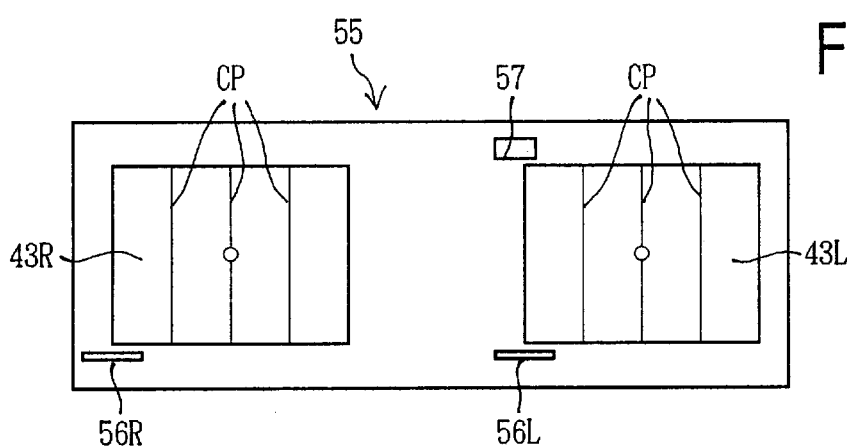
FIG. 16a is a back view of a focusing plate holder in the device for detecting the amount of correcting the parallax.
Figure 16B:
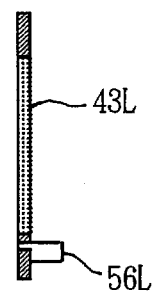
FIG. 16b is a side sectional view thereof.

FIG. 16 is a back view of when a focusing plate holder 55 is viewed from the side of the projecting lenses 42R and 42L. Collimation patterns CP chiefly comprising vertical lines are formed on the right and left focusing plates 43R and 43L. Image sensors 56R and 56L for detecting the positions of perforations in the film are provided under the focusing plates 43r and 43L. A small window 57 is formed in the inner edge of the left focusing plate 43L (right in the drawing).

Figure 17:
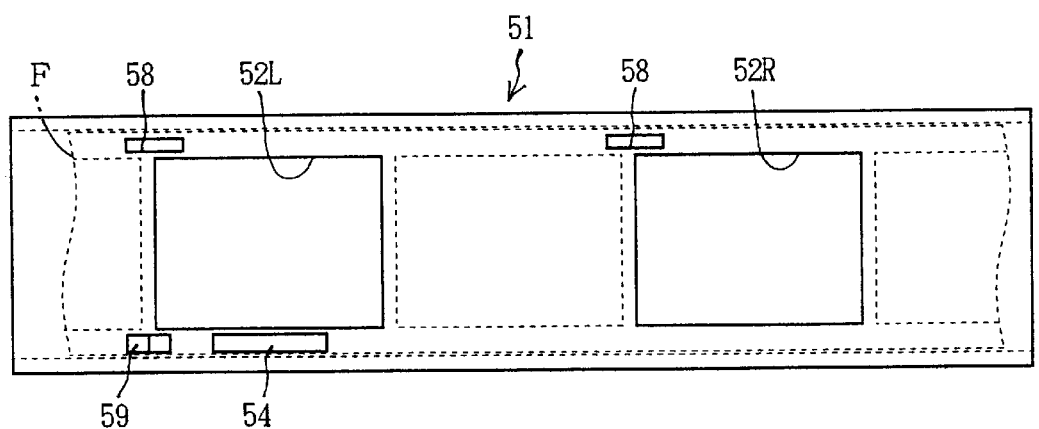
FIG. 17 is a front view of a film holder in the device for detecting the amount of correcting the parallax.

Referring to FIG. 17, small windows 58 and 59 are formed at a left upper portion and a left lower portion of the left window 52L of the film holder 51, and the lower small window 59 is fitted with a glass on which is described a reference line that serves as an index for positioning the film. An image in the lower small window 59 is projected onto the upper small window 57 of the focusing plate holder 55. If the reference line of the lower small window 59 of the film holder 51 is brought into agreement with the positioning index line recorded on the film while observing the image on the small window 57, then the pictures of the films come into strict agreement with the positions of the windows 52R and 52L of the holder 51.

When the film is to be fed by a motor, an image sensor may be provided in the lower small window 59 of the film holder 51 and the operation for feeding the film may be controlled based on the image data detected by the image sensor, in order to automatically bring the reference line into agreement with the positioning index line.

Perforations of the films are projected onto the image sensors 56R and 56L provided at lower portions of the focusing plate holder 55, so that the image sensors 56R and 56L scan the projected images of perforations in the horizontal direction.

For example, the scanning is effected outward from a position regarded to be a gap between the pictures slightly on the inner side of the positions of inner vertical frames of the right and left focusing plates 43R and 43L. If the position for starting the scanning is the position of a perforation, the outputs of the image sensors 56R and 56L are of a white level due to light passing through the perforations and then change into a black level when the perforations pass away. When the position for starting the scanning is a position of gap between the perforations, the outputs of the image sensors 56R and 56L are of the black level which, then, changes into the while level when the perforations arrive, and then changes into the black level when the perforations pass away. In any way, a point at where the output levels of the image sensors 56R and 56L change from the white level into the black level is an inner edge of the perforation at an end when the film is cut into a frame, and this position is detected. The positions of perforations projected onto the focusing plates 43R and 43L change depending upon the projection magnification, and differ from the absolute positions of perforations with respect to the real pictures of the films. Therefore, the control unit divides the position data (distance from the center of the focusing plate to a position where a perforation is detected) by the projection magnification at that moment to calculate the data of real position of perforation, and stores this data in the memory.

Various films now available have markings such as frame numbers recorded on the upper and lower edges of the films, and the one-dimensional line sensor may not be able to distinguish the frame numbers from the perforations. This confusion, however, is overcome if a two-dimensional picture pattern scanned by the two-dimensional area sensor along the perforations is analyzed by a pattern recognition processing unit to distinguish the pattern of the perforations from the patterns of other markings.

As described above, if the positioning of the pictures of the films and the windows 52R, 52L of the film holder 51 is accomplished either manually or automatically, and the pictures on the right and left focusing plates 43R and 43L are viewed in a three-dimensional manner in a state where the projection magnification is automatically controlled based on the data of photographing distance recorded on the films, then, a stereo picture can be observed with a picture masking factor same as that of when the films are mounted on the stereo slide mount by using a framing mask 31 having a width of windows corresponding to the data of photographing distance.

In this state, however, both the right and left sides of the pictures of the films have been masked, and the offset amount of the pictures in the lateral direction must be adjusted to correct the parallax. Therefore, the offset is adjusted by adjusting the gap between the right and left projecting lenses 42R and 42L by manually turning the cam 49 for adjusting the distance between the optical axes located between the right and left lateral sliders 47R and 47L shown in FIG. 12.

When the gap between the right and left projecting lenses 42R and 42L is increased, the projected picture is offset outward. When the gap between the right and left projecting lenses 42R and 42L is decreased, on the other hand, the projected picture is offset inward, and a state where the parallax is corrected can be observed.

When the offset is adjusted while observing the picture on the focusing plates 43R and 43L through the eyepieces 44R and 44L, perspective feeling of the collimation pattern of the focusing plates 43R, 43L and of the three-dimensional picture varies. A state in which the stereo image is seen on the same plane as the collimation pattern or at the back of the collimation pattern, is an offset state best suited for the stereo photography.

If a determining key (not shown) on the operation panel is depressed in a state where the parallax is properly corrected, the perforations are scanned by the image sensors 56R and 56L, and the data related to the positions of perforations and the frame number are input to the memory in the control unit and are stored therein.

In the case of a film taking a picture of an article at a distance very closer than a subject at the focal point, the correction may not often be sufficient despite the offset is adjusted up to its limit with a picture masking amount of a projection magnification (#0, - - - , #6) that is automatically set based on the data of photographing distance. In such a case, the projection magnification must be further increased to increase the masking amount. Therefore, the mechanism must be so constituted that the projection magnification can be changed over stepwisely by arbitrarily operating the mechanism for adjusting the projection magnification. When the distance between the optical axes of the projecting lenses 42R and 42L manually adjusted exceeds a maximum limit of projection magnification that is automatically set, this fact may be detected to automatically increase the projection magnification by one step.

FIG. 18 illustrates a mount-forming device 111 for forming protuberances on the base frame of a stereo slide mount made of a thermoplastic resin to accomplish the positioning in the right-and-left direction of the films.

A portal frame 113 is installed on a base 112 of the mount-forming device 111, Y-rails 114 are secured onto the portal frame 113, an electromagnetic induction heater 115 is disposed on the front left side of the portal frame 113, and a mount-feeding unit 116 is disposed on the front right side of the portal frame 113.

A plunger carriage 117 is mounted on the Y-rails 114. A z-axis actuator 118 is mounted on a front portion of the plunger carriage 117 driven by a linear servo motor (not shown), and a plunger holder 119 is attached to a lower end of a ram 118a of the z-axis actuator 118.

Four round-rod heat plungers 120 are attached to the lower surface of the plunger holder 119, a pitch of the heat plungers 120 in the x-axis direction (back-and-forth direction in FIG. 18) being equal to the pitch between an upper perforation and a lower perforation of the 135-type film, and a pitch of the heat plungers 120 in the y-axis direction (right-and-left direction in FIG. 18) being slightly larger than the pitch between the perforations at the right and left extreme ends of the film that is cut into a frame.

Figure 19A:
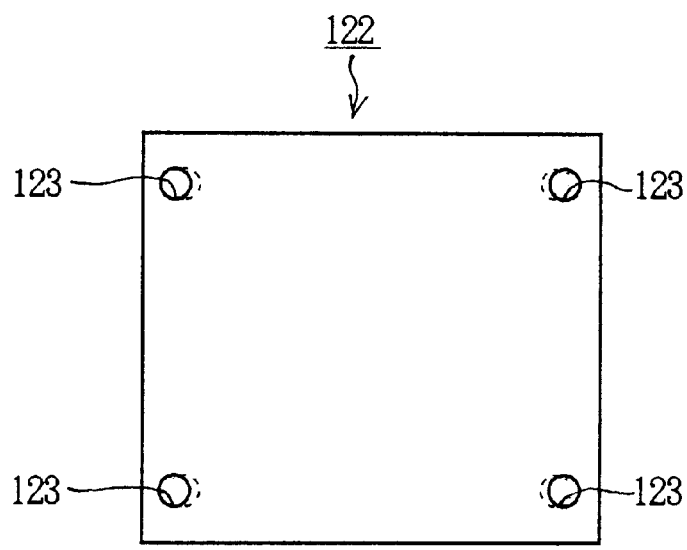
FIG. 19a is a plan view of a die plate.
Figure 19B:
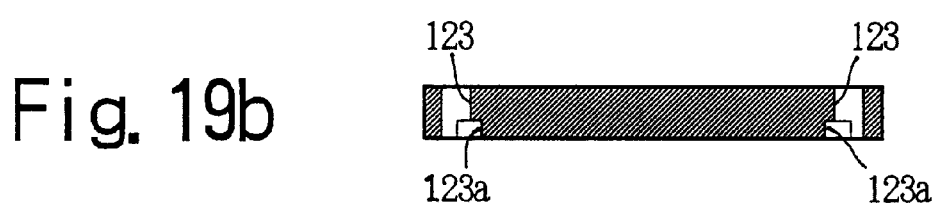
FIG. 19b is a side sectional view thereof.
Figure 19C:
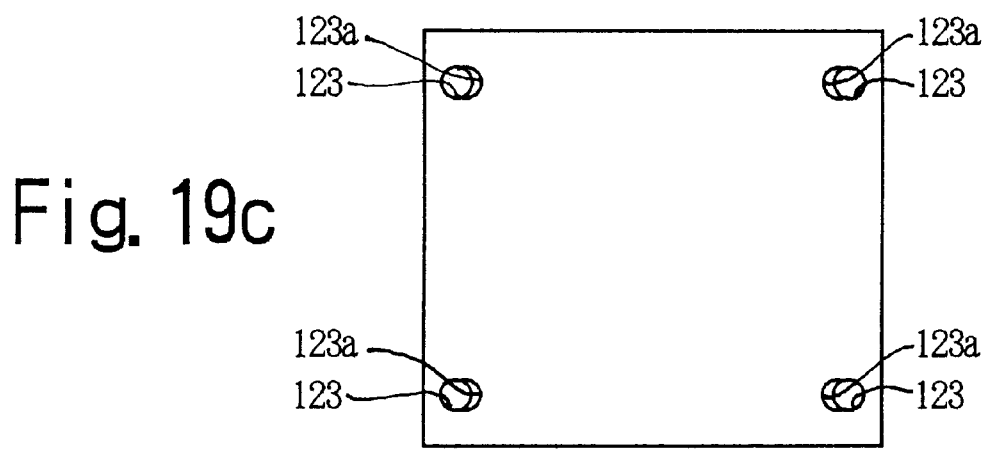
FIG. 19c is a bottom view thereof.

A die plate hoist 121 is mounted on the right end of the portal frame 113, and a die plate 122 is mounted on the die plate hoist 121. Holes 123 are formed in the die plate 122 at four places corresponding to the four heat plungers 120 of the plunger holder 119. Referring to FIG. 19, circular recessed portions 123a are formed in the lower surface of the die plate 122, the circular recessed portions 123a being deviated toward the center from the holes 123 in the right-and-left direction of the die plate 122. A gap between the outer peripheral surfaces of the right and left recessed portions 123a is equal to the gap between the perforations at the right and left extreme ends of the film cut into a frame. It is desired that the plunger holder 119 and the die plate 122 are made of a material having a small coefficient of expansion in order to prevent a dimensional change due to a change in the temperature, and that the heat plungers 120 are mounted on the plunger holder 119 via a heat-insulating support member.

The mount-feeding unit 116 includes a mount carriage 125 mounted on Y-rails 124 on the upper surface thereof. A mount carriage 125 is slid by a linear servo motor (not shown), and a control unit (not shown) controls the Y-coordinates of the mount carriage 125 relying on the position data input from the device 41 for detecting the amount of correcting the parallax. A mount holder unit 125a is provided on the upper surface of the mount carriage 125, enabling the base frame 21 of the stereo slide mount to be loaded and secured in the mount holder portion 125a.

When the plunger carriage 117 is moved to the left end of the moving range to lower the plunger holder 119, the four heat plungers 120 are inserted in the holes at four places in the upper surface of the electromagnetic induction heater 115, and the heat plungers 120 are heated by the electromagnetic induction. Furthermore, the plunger carriage 117 is moved toward the right while so controlling the feeding amount that the four heat plungers 120 of the plunger holder 119 stop at a position to come into agreement with the holes 123 at four places of the die plate 122. After the stop, the plunger holder 119 is lowered, so that the ends of the heat plungers 120 are inserted in the holes 123 of the die plate 122.

The mount-forming device 111 is controlled for its series of operations by a control unit, and forms protuberances on the base frame 21 based on the position data of perforations at the right and left extreme ends of the film detected by the device 41 for detecting the amount of correcting the parallax.

The operation will now be described below. First, the base frame 21 of the stereo slide mount is mounted on a mount holder unit 125a of the mount carriage 125, and a formation execution instruction is input. Then, the position data of perforations are transferred from the detection device 41 to the mount-forming device 111, the plunger holder 119 of the plunger carriage 117 at the left end is lowered, and the heat plungers 120 are inserted in the holes of the electromagnetic induction heater 115 and are heated. At the same time, the control unit drives the mount carriage 125 based on the position data of perforations to a position where the relative positions of the holes 123 of the upper die plate 122 and of the left window 102L of the base frame 21 come into agreement with the relative positions of the left picture detected by the detecting device 41 and of the perforations. Then, the die plate hoist 121 lowers the die plate 122, whereby the die plate 122 is intimately adhered to the left window 23L of the base frame 21, and the die plate 122 is positioned and secured at a correct machining position of the left window 23L of the base frame 21. Thereafter, the heated plunger 120 is raised from the electromagnetic induction heater 115 and, then, the plunger carriage 117 is moved toward the right and is stopped at a position equal to the die plate 122. The plunger holder 119 is then lowered so that the heat plungers 120 are inserted in the holes 123 of the die plate 122 and come in contact with the base frame 21.

Figure 20:
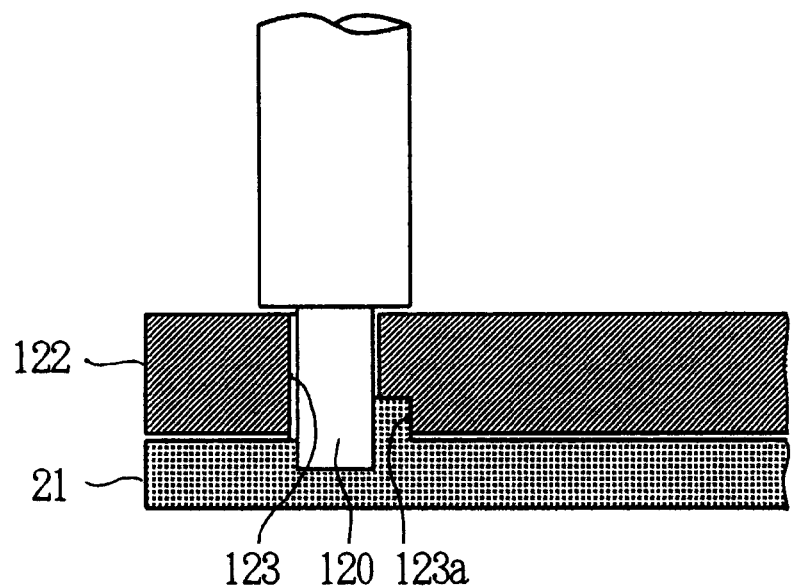
FIG. 20 is a sectional view illustrating a step for forming a protuberance on the base frame.
Figure 21:
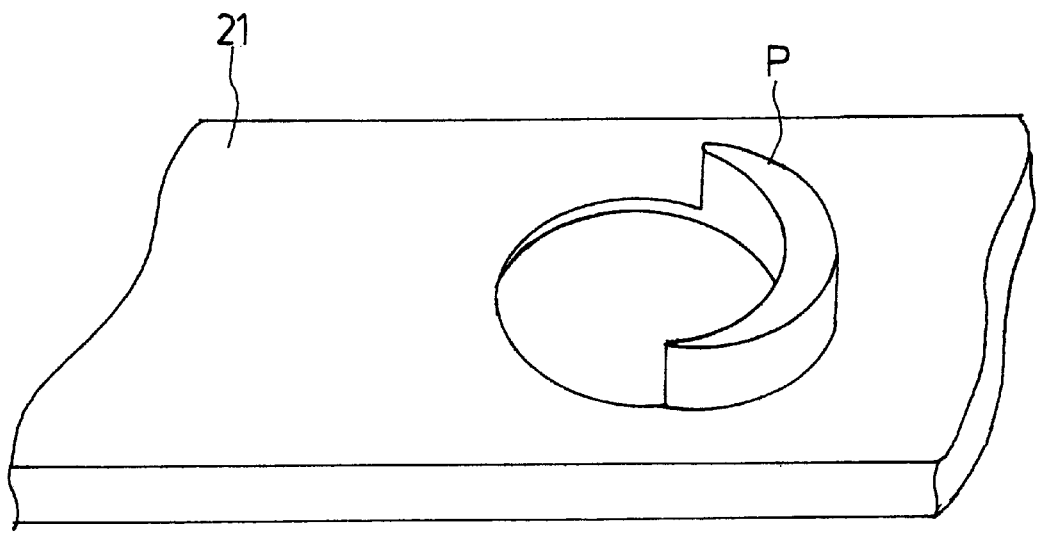
FIG. 21 is a partial perspective view of the base frame showing the shape of the protuberance.
Figure 24A:
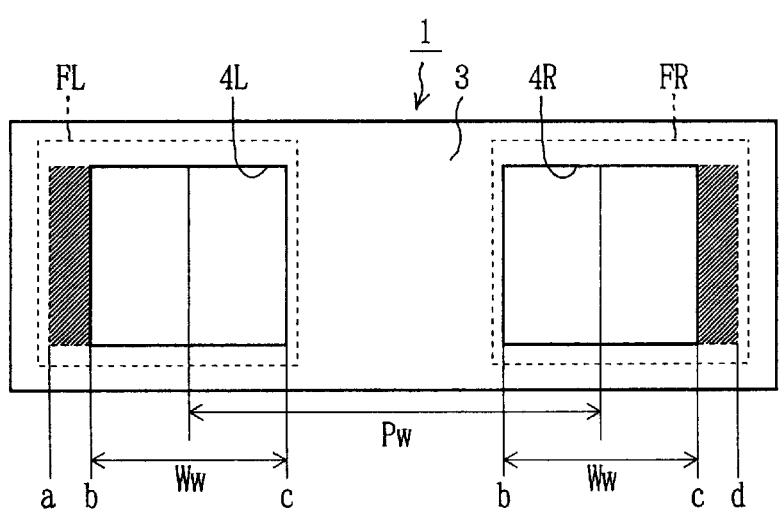
FIG. 24a is a front view of a stereo slide mount mounting the films taking a picture of a subject at the shortest distance.
Figure 24B:
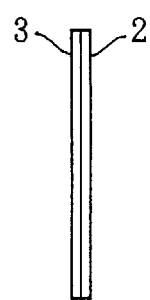
FIG. 24b is a side view thereof.
Figure 25:
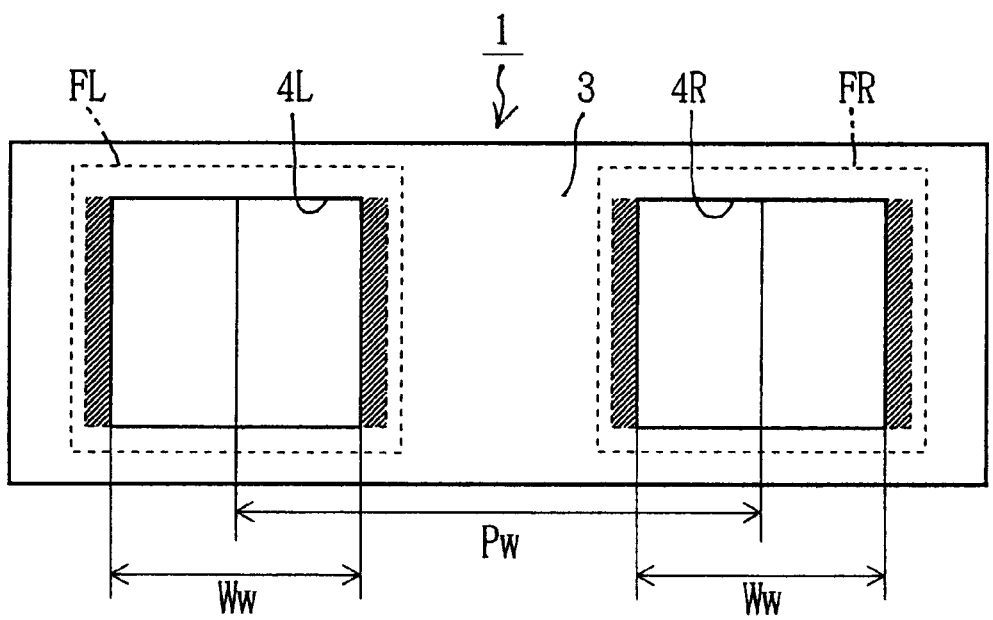
FIG. 25 is a front view of the stereo slide mount mounting the films taking a picture of a subject at an infinite point according to the prior art.

Then, as shown in FIG. 20, the base frame 21 is melted at portions contacting to the heat plungers 120, and the molten resin flows into the recessed portions 123a in the die plate 122. Then, when the plunger holder 119 is raised, the molten resin solidifies as it is robbed of heat by the die plate 122, and crescent-shaped protuberances P are formed as shown in FIG. 21.

Then, the die plate 122 is raised to move the mount carriage 125 to a position where the four points at where the protuberances of the right window 23R of the base frame 21 will be formed come into agreement with the holes 123 in the upper die plate 122 in the same manner as in the step of forming the protuberances of the left window 23L. Then, the die plate 122 is lowered and is press-contacted to the base frame 21, and the plunger holder 119 is lowered to form protuberances P at four places surrounding the right window 23R of the base frame 21 in the same manner as for the left window.

Though not diagramed, a printer such as an ink-jet printer is arranged near the mount-feeding unit 116 or on the base 112 of the mount-forming device 111, to print, onto the base frame 21, a frame number and a guide number of the framing mask to be mounted on the base frame 21, before or after the step of forming protuberances. The frame number needs not be like 1R or 1L for discriminating R and L, but may simply be a numerical figure. If the position for printing the frame number is set to be, for example, the central lower part of the base frame, the direction of numeral can be judged from the position where the numeral is printed, and 6 and 9 are not confusingly read.

The guide number of the framing mask expressed by a numerical figure will be confusingly read as the frame number. When the guide number is #0, no masking is necessary and no mark is recorded. If #1 is recorded as A, #2 as B, #3 as C, - - - , #6 as F, then, the guide numbers can be comprehended at a glance.

To mount the films on the base frame 21 forming protuberances P, the films are cut at a position of the vertical line Lc which is a target for cutting and are placed on the windows of the base frame 21 while bringing the perforations into engagement with the right, left, upper and lower protuberances P. When a sign of the framing mask is expressed, the framing mask 31 of a guide number corresponding to the expressed character is superposed on the films and is positioned relying on the pins 25 of the base frame 21. Then, the cover frame 22 is fitted to the base frame 21 so as to be mounted thereon in a state where the offset amount of the pictures on the films is relatively equal to the offset amount detected by the device 41 for detecting the amount of correcting the parallax.

According to the stereo camera of the present invention as described above, the distance between the optical axes of the right and left photographing lenses is so selected that the photographing ranges of the right and left photographing lenses come into agreement with each other in an intermediate region in the range for adjusting the focal point unlike that of the conventional stereo cameras. Therefore, the non-overlapping regions of the right and left pictures are decreased to halve the loss of pictures.

It should be noted that the present invention is in no way limited to the above-mentioned embodiment only but can be variously modified within the technical scope of the present invention, and the invention encompasses such modifications, as a matter of course.

I claim:

1. A stereo camera comprising:

right and left photographing lenses having photographing ranges for taking right and left pictures and a shortest photographing distance, wherein a distance between the optical axes of the right and left photographing lenses is fixed midway between a picture distance equal to a distance between the centers of the right and left pictures and a shortest focal distance between the optical axes at which the photographing ranges of the right and left photographing lenses come into agreement with each other at the shortest photographing distance.

2. A stereo camera comprising:

right and left photographing lenses having photographing ranges for taking right and left pictures and a shortest photographing distance, wherein a distance between the optical axes of the right and left photographing lenses is fixed to lie in a range between a distance shorter by at least 1.2 mm than a picture distance between the centers of the right and left pictures and a shortest focal distance between the optical axes at which the photographing ranges of the right and left photographing lenses come into agreement with each other at the shortest photographing distance.

3. A stereo camera for use with a film comprising:

an optical or magnetic device for recording data related to a focal distance at a time of taking right and left pictures on an upper part or lower part of the right and left pictures on the film in the stereo camera.

4. A stereo camera according to claim 2, further comprising:

a device, coupled to the stereo camera, for recording data related to the distance.

5. A stereo camera according to claim 2, further comprising:

an index-recording device for recording an index of a vertical line between neighboring pictures on film in the stereo camera.

6. A stereo camera according to claim 5, wherein a film-feeding mechanism is so constituted that perforations are located at a position midway between the neighboring pictures on the film in the stereo camera, and said index line is recorded at a position intersecting said perforations.

7. A stereo camera according to claim 2, further comprising:

a number-recording device for recording a frame number and characters for discriminating the right and left pictures on an upper part or a lower part of the pictures on film in the stereo camera.

8. A stereo camera comprising:

a first photographing lens having a first optical axis;

a second photographing lens having a second optical axis;

the first and second optical axes being positioned at a fixed separation distance substantially midway between an infinite focal separation distance of the first and second optical axes when said first and second photographing lenses are positioned at an infinite focal distance and a shortest focal separation distance of the first and second optical axis when said first and second photographing lenses are positioned at a shortest focal distance, whereby the loss of a picture when mounted so as to be stereoscopically viewed is reduced.

9. A stereo camera as in claim 8 further comprising:

a focal distance recording unit, said focal distance recording unit recording a focal distance of said first and second photographing lenses at the time of taking a picture.

10. A stereo camera as in claim 8 further comprising:

an index recording unit, said index recording unit recording a vertical line between pictures.

11. A stereo camera as in claim 8 further comprising:
a number recording unit, said number recording unit recording a frame number and characters for discriminating right and left pictures.

12. A stereo camera as in claim 10 further comprising:
a film-feeding mechanism, said film-feeding mechanism locating perforation in a film positioned midway between neighboring pictures on the film,
whereby the vertical line intersects the perforation.

13. A stereo camera comprising:
a first photographing lens having a first optical axis;
a second photographing lens having a second optical axis;
the first and second optical axes being positioned at a fixed separation distance between a separation distance range of 1.2 mm less than an infinite focal separation distance of the first and second optical axes when said first and second photographing lenses are positioned at an infinite focal distance and a shortest focal separation distance of the first and second optical axes when said first and second photographing lenses are positioned at a shortest focal distance,
whereby the loss of a picture when mounted so as to be stereoscopically viewed is reduced.

14. A stereo camera as in claim 13 further comprising:
a focal distance recording unit, said focal distance recording unit recording a focal distance of said first and second photographing lenses at the time of taking a picture.

15. A stereo camera as in claim 13 further comprising:
an index recording unit, said index recording unit recording a vertical line between pictures.

16. A stereo camera as in claim 14 further comprising:
a film-feeding mechanism, said film-feeding mechanism locating perforation in a film positioned midway between neighboring pictures on the film,
whereby the vertical line intersects the perforation.

17. A stereo camera as in claim 13 further comprising:
a number recording unit, said number recording unit recording a frame number and characters for discriminating right and left pictures.

18. A stereo camera comprising:
a first lens having a first optical axis; and
a second lens having a second optical axis,
said first and second lens being fixed in a position so that the first optical axis and the second optical axis are separated by a distance according to the following equation, $$(P_f + Pl_{min})/2 = d$$

where,
d=the distance,
$P_f$=distance between the first and second optical axis at which photographing ranges of said first and second lenses come into agreement with each other at an infinite point,
$Pl_{min}$=distance between the first and second optical axis at which photographing ranges come into agreement with each other at the shortest photographing distance,
whereby a loss of picture is reduced upon mounting film taken with the stereo camera.

19. A stereo camera comprising:
a first lens having a first optical axis; and
a second lens having a second optical axis,
said first and second lens being fixed in a position so that the first optical axis and the second optical axis are separated by a distance within a range according to the following inequality, $$Pl_{min} < d < (P_f - 1.2)$$

where,
d=the distance in millimeters,
$P_f$=distance, in millimeters, between the first and second optical axis at which photographing ranges of said first and second lenses come into agreement with each other at an infinite point,
$Pl_{min}$=distance, in millimeters, between the first and second optical axis at which photographing ranges come into agreement with each other at the shortest photographing distance,
whereby a loss of picture is reduced upon mounting film taken with the stereo camera.

20. A method of adjusting a stereo camera having right and left photographing lenses with respective right and left optical axes and right and left picture locations comprising the steps of:
setting a picture location distance between the centers of the right and left picture locations; and
adjusting a distance between the right and left optical axes of the right and left photographing lenses so that the difference between the picture location distance and the distance between the right and left optical axes of the right and left photographing lenses is equal to or greater than 1.2 mm,
whereby loss of picture is decreased upon mounting a film in a stereo slide mount.

21. A stereo camera having right and left photographing lenses with respective right and left optical axes and right and left picture locations comprising:
means for setting a picture location distance between the centers of the right and left picture locations; and
means for adjusting a distance between the right and left optical axes of the right and left photographing lenses so that the difference between the picture location distance and the distance between the right and left optical axes of the right and left photographing lenses is equal to or greater than 1.2 mm,
whereby loss of picture is decreased upon mounting a film in a stereo slide mount.

* * * * *

UNITED STATES PATENT AND TRADEMARK OFFICE
CERTIFICATE OF CORRECTION

PATENT NO. : 6,301,446 B1
DATED : October 9, 2001
INVENTOR(S) : Inaba

It is certified that error appears in the above-identified patent and that said Letters Patent is hereby corrected as shown below:

<u>Title page,</u>
Item [76], inventor's address, "No. 1115" should read -- No. 1116 --; and "Oyami" should read -- Oyama --.

Signed and Sealed this

Tenth Day of September, 2002

Attest:

JAMES E. ROGAN
Attesting Officer     Director of the United States Patent and Trademark Office